US011317444B2

United States Patent
Bai et al.

(10) Patent No.: US 11,317,444 B2
(45) Date of Patent: Apr. 26, 2022

(54) RANDOM ACCESS CHANNEL (RACH) DESIGN

(71) Applicant: QUALCOMM Incorporated, San Diego, CA (US)

(72) Inventors: Tianyang Bai, Bridgewater, NJ (US); Navid Abedini, Somerset, NJ (US); Juergen Cezanne, Ocean Township, NJ (US); Muhammad Nazmul Islam, Edison, NJ (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 644 days.

(21) Appl. No.: 16/177,055

(22) Filed: Oct. 31, 2018

(65) Prior Publication Data

US 2019/0141754 A1 May 9, 2019

Related U.S. Application Data

(60) Provisional application No. 62/581,384, filed on Nov. 3, 2017.

(51) Int. Cl.
*H04W 56/00* (2009.01)
*H04W 74/08* (2009.01)
(Continued)

(52) U.S. Cl.
CPC ....... *H04W 74/0833* (2013.01); *H04L 5/0048* (2013.01); *H04L 27/2607* (2013.01);
(Continued)

(58) Field of Classification Search
None
See application file for complete search history.

(56) References Cited

U.S. PATENT DOCUMENTS 9,264,961 B1\* 2/2016 Shah .................. H04W 36/30
2010/0265931 A1\* 10/2010 Loc .................... G08B 21/0266
370/338

(Continued)

FOREIGN PATENT DOCUMENTS

WO 2008095938 A1 8/2008

OTHER PUBLICATIONS

International Search Report and Written Opinion—PCT/US2018/058762—ISA/EPO—dated Jan. 25, 2019.

*Primary Examiner* — Huy D Vu
*Assistant Examiner* — Bao G Nguyen
(74) *Attorney, Agent, or Firm* — Loza & Loza LLP

(57) ABSTRACT

Aspects of the present disclosure provide for random access channel (RACH) configuration in wireless communication systems. In some examples, a RACH configuration may be selected for use by a scheduled entity in transmitting a RACH signal to a scheduling entity based on an estimated timing advance value. The RACH configuration may include, for example, a transmission time of the RACH signal and/or a RACH waveform configuration identifying at least a cyclic prefix (CP) length and a guard time (GT) for the RACH signal. In some examples, the CP and GT length may each be set to the difference between an estimated maximum round-trip time (RTT) and an estimated minimum RTT between the scheduled entity and the scheduling entity. In some examples, the timing advance value may be estimated as the estimated minimum RTT.

27 Claims, 19 Drawing Sheets

(51) Int. Cl.
*H04L 27/26* (2006.01)
*H04L 5/00* (2006.01)
*H04W 74/00* (2009.01)

(52) U.S. Cl.
CPC ....... *H04L 27/2646* (2013.01); *H04W 56/001* (2013.01); *H04W 56/009* (2013.01); *H04W 56/0045* (2013.01); *H04W 74/002* (2013.01); *H04L 5/0007* (2013.01)

(56) References Cited

U.S. PATENT DOCUMENTS

| | | | |
|---|---|---|---|
| 2014/0044108 A1* | 2/2014 | Earnshaw | G01S 5/0063 370/336 |
| 2015/0156750 A1* | 6/2015 | Quan | H04W 56/0045 370/329 |
| 2018/0076839 A1* | 3/2018 | Baghel | H04W 76/20 |
| 2018/0199360 A1* | 7/2018 | Lin | H04W 72/1268 |

* cited by examiner

RANDOM ACCESS CHANNEL (RACH) DESIGN

PRIORITY CLAIM

This application claims priority to and the benefit of Provisional Patent Application No. 62/581,384 filed in the U.S. Patent and Trademark Office on Nov. 3, 2017, the entire contents of which are incorporated herein by reference as if fully set forth below in their entirety and for all applicable purposes.

TECHNICAL FIELD

The technology discussed below relates generally to wireless communication systems, and more particularly, to configuration of a random access channel (RACH) in a wireless communication network.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

In order for a user equipment (UE) to communicate with a base station, such as a gNB within a 5G wireless communication system, the UE informs its presence to the base station. UEs may inform their presence to the base station either initially or after link failure using a random access procedure in which each UE transmits a randomly selected preamble sequence and the base station allocates resources to detected UEs by transmitting random access response messages to the detected UEs.

A random access signal may be transmitted by a UE on an uplink random access channel (RACH). The RACH signal waveform may include the randomly selected preamble, along with a cyclic prefix (CP) that includes a portion of the preamble copied to the beginning of the RACH signal waveform and a guard time (GT) at the end of the RACH signal waveform. Since the round-trip time (RTT) of communications between the base station and each UE may be different depending on the location of the UE, the CP and GT may each be designed to be equal to the maximum RTT that may be experienced by a UE served by the base station to ensure that RACH signals received from different UEs (and different locations) may be decoded appropriately. Thus, the RACH signal duration may be set to be equal to the preamble length plus twice the maximum RTT.

RACH signals may also be utilized in backhaul systems, such as Integrated-Access-Backhaul (IAB) networks that utilize wireless spectrum for both access links (links to UEs) and backhaul links (links to the core network). An IAB network may be formed of IAB nodes, such as base stations (e.g., gNBs), that support access for UEs and backhaul of access traffic flows to/from a mobile core network.

As the demand for mobile broadband access continues to increase, research and development continue to advance communication technologies, including technologies for enhancing RACH signals in particular, not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to the configuration of RACH signals in wireless communication systems, including but not limited to those specified under standards for 5G New Radio (NR). In some examples, a RACH configuration may be selected for use by a scheduled entity in transmitting a RACH signal to a scheduling entity based on an estimated timing advance value. The RACH configuration may include, for example, a transmission time of the RACH signal and/or a RACH waveform configuration identifying at least a cyclic prefix (CP) length and a guard time (GT) for the RACH signal. In some examples, the CP and GT length may each be set to the difference between an estimated maximum round-trip time (RTT) and an estimated minimum RTT between the scheduled entity and the scheduling entity. In some examples, the estimated timing advance value may be utilized as the estimated minimum RTT.

In one aspect of the disclosure, a method for a scheduled entity to communicate with a scheduling entity in a wireless communication network is provided. The method includes estimating a timing advance value for communicating with the scheduling entity, selecting a random access channel (RACH) configuration utilizing the timing advance value, and transmitting a RACH signal utilizing the RACH configuration, in which the RACH configuration includes at least one of a waveform configuration of the RACH signal or a transmission time of the RACH signal.

Another aspect of the disclosure provides a scheduled entity in a wireless communication network. The scheduled entity includes a processor, a transceiver communicatively coupled to the processor and configured to communicate with a scheduling entity in the wireless communication network, and a memory communicatively coupled to the processor. The processor is configured to estimate a timing advance value for communicating with the scheduling entity, select a random access channel (RACH) configuration utilizing the timing advance value, and transmit a RACH signal utilizing the RACH configuration via the transceiver, in which the RACH configuration includes at least one of a waveform configuration of the RACH signal or a transmission time of the RACH signal.

Another aspect of the disclosure provides a method of wireless communication operable at a scheduling entity within a wireless communication network. The method includes transmitting a signal to a scheduled entity for use by the scheduled entity in estimating a timing advance value, and receiving a random access channel (RACH) signal from the scheduled entity based on the timing advance value, in which the RACH signal includes a RACH configuration selected utilizing the timing advance value, and the RACH configuration includes at least one of a waveform configuration of the RACH signal or a transmission time of the RACH signal.

Another aspect of the disclosure provides a scheduling entity in a wireless communication network. The scheduled entity includes a processor, a transceiver communicatively coupled to the processor and configured to communicate with a scheduled entity in the wireless communication network, and a memory communicatively coupled to the processor. The processor is configured to transmit a signal to the scheduled entity via the transceiver for use by the scheduled entity in estimating a timing advance value, and receiving a random access channel (RACH) signal via the transceiver from the scheduled entity based on the timing advance value, in which the RACH signal includes a RACH configuration selected utilizing the timing advance value, and the RACH configuration includes at least one of a waveform configuration of the RACH signal or a transmission time of the RACH signal.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
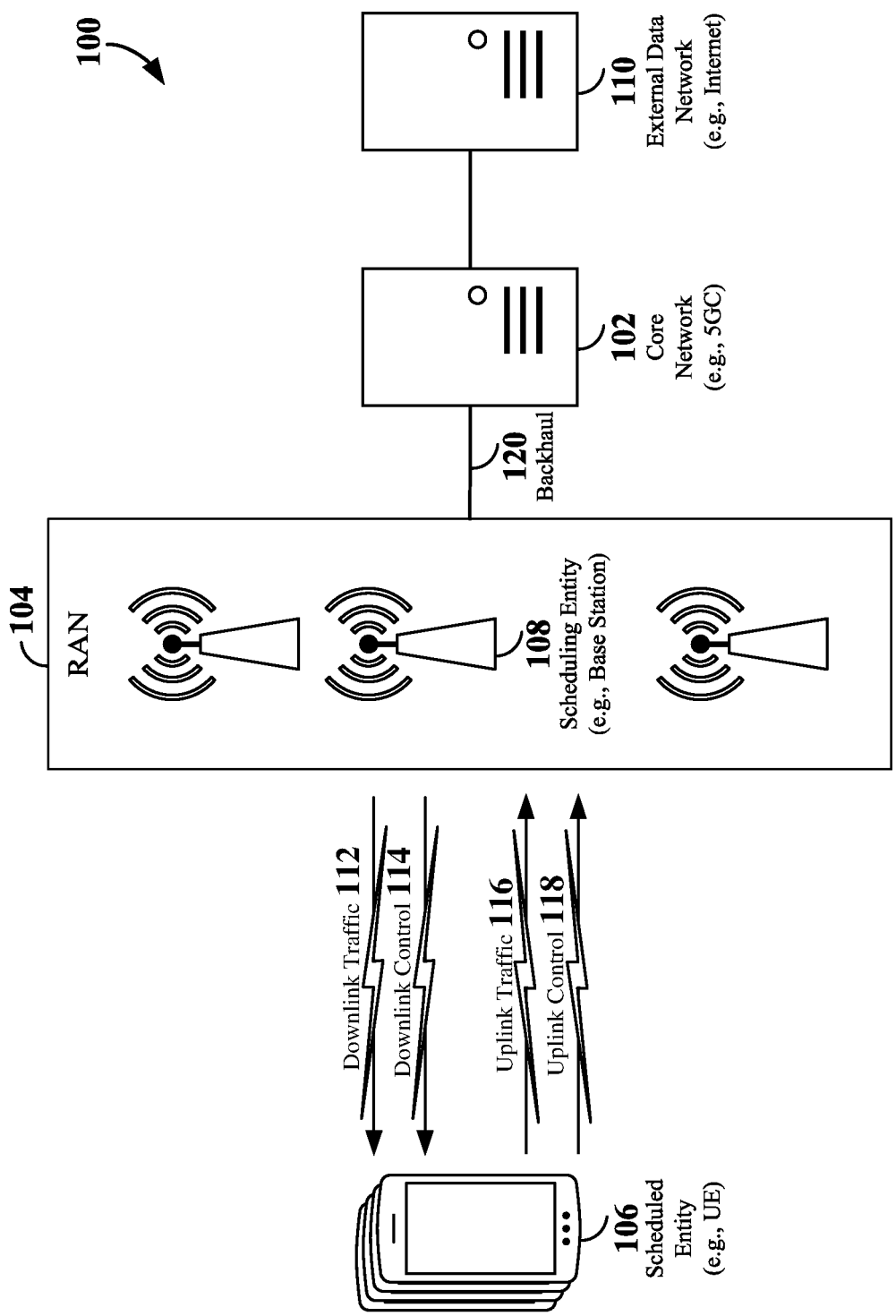
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
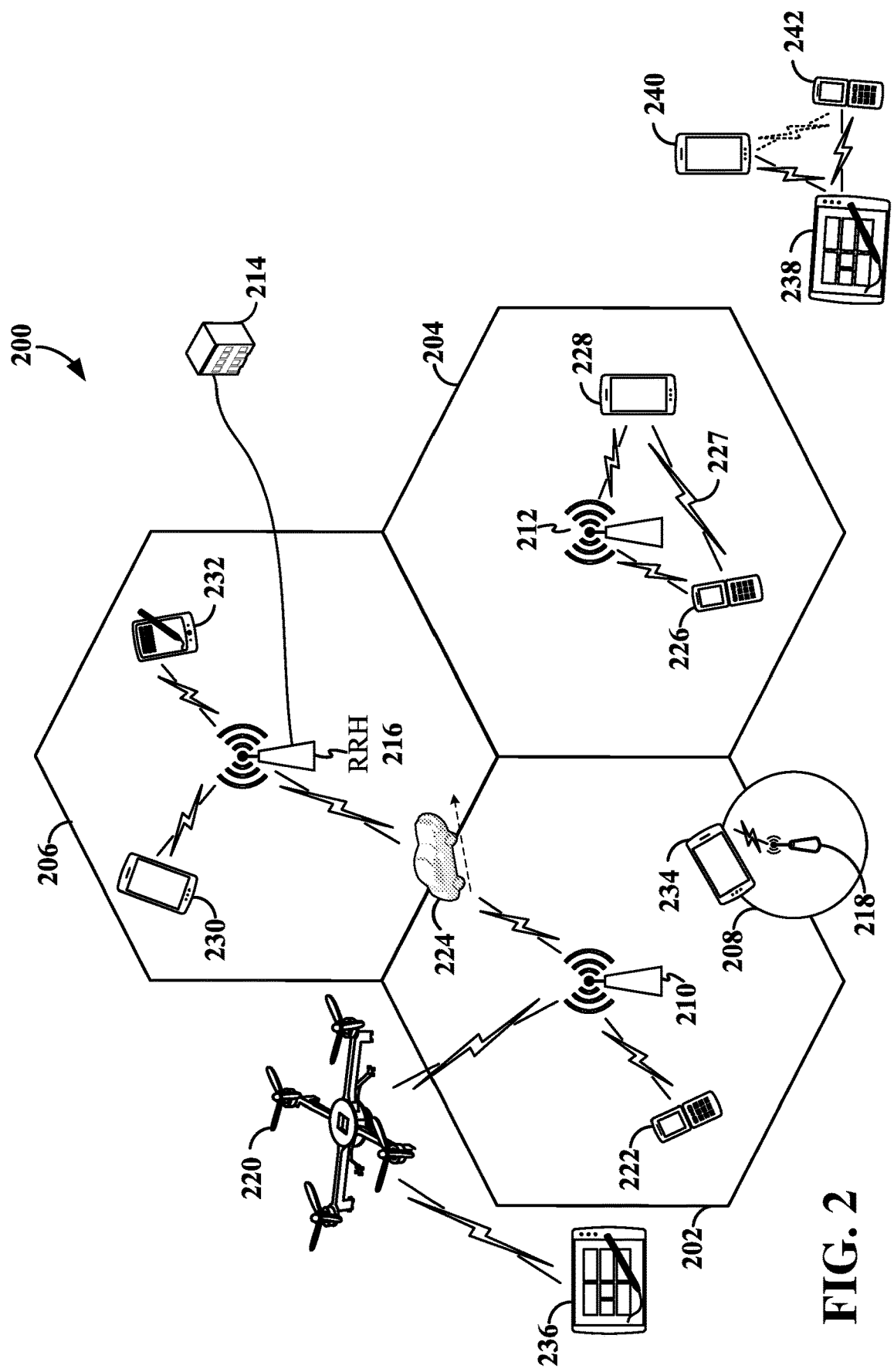
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
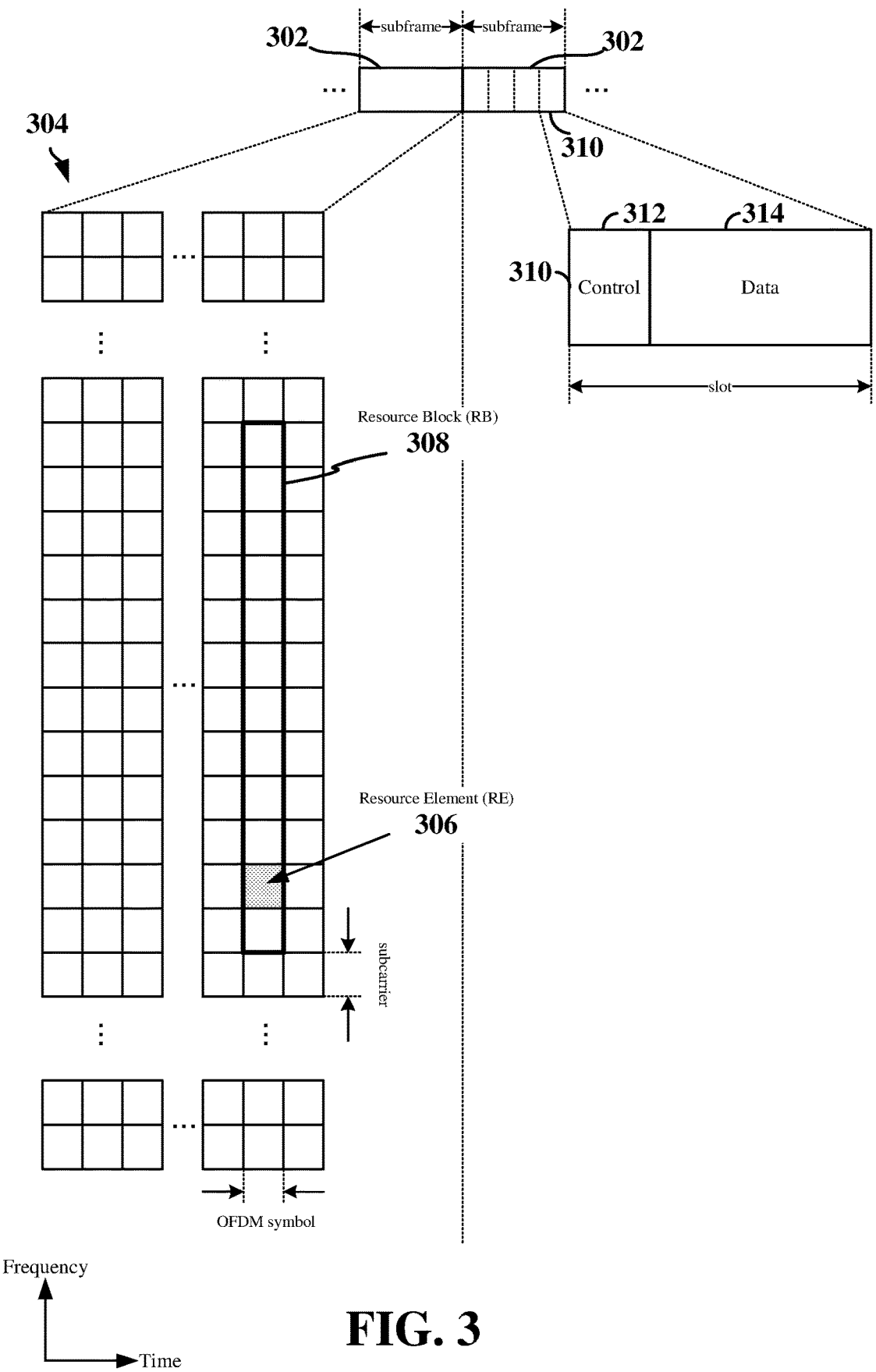
FIG. 3 is a schematic diagram illustrating organization of wireless resources in an air interface utilizing orthogonal frequency divisional multiplexing (OFDM).

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 2 and 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
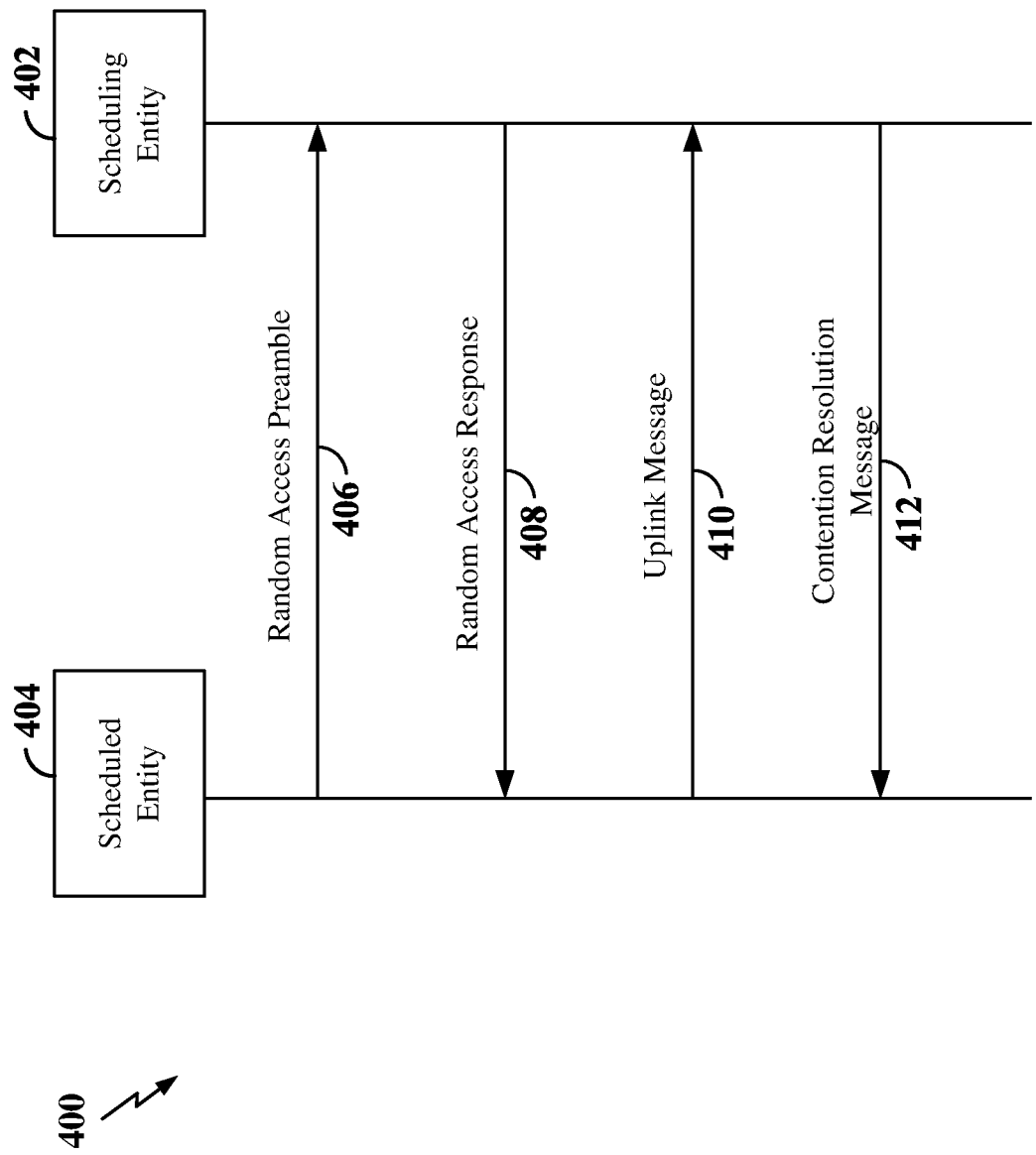
FIG. 4 is a diagram illustrating an example of a contention based random access procedure utilizing a random access channel (RACH).

One example of an uplink control channel is the Random Access Channel (RACH). The RACH may be used, for example, in a random access procedure during initial access of the uplink FIG. 4 is a diagram illustrating an example of a contention based random access procedure 400 between a scheduling entity 402 and a scheduled entity 404. The scheduling entity 402 may correspond, for example, to any of the scheduling entities shown in FIGS. 1 and/or 2. In addition, the scheduled entity 404 may correspond, for example, to any of the scheduled entities shown in FIGS. 1 and/or 2.

The random access procedure 400 shown in FIG. 4 is initiated by the scheduled entity 404 randomly selecting a preamble from an available set of preambles within the cell served by the scheduling entity 402, and transmitting the selected preamble to the scheduling entity 402 in a RACH preamble message 406. In an example, the scheduled entity 404 may select from 64 possible preamble sequences for inclusion in the RACH preamble message 406.

If the preamble is successfully detected by the scheduling entity 402, the scheduling entity 402 transmits a random access response (RAR) message 408 to the scheduled entity 404 on the physical downlink control channel (PDCCH). The RAR message 408 includes an identifier of the preamble sent by the scheduled entity 404, a Timing Advance (TA), a temporary cell radio network temporary identifier (TC-RNTI) or random access (RA) RNTI for the scheduled entity 404 and a grant of assigned uplink resources. Upon receipt of the RAR message 408, the scheduled entity 404 compares the preamble ID to the preamble sent by the scheduled entity in the RACH preamble message 406. If the preamble ID matches the preamble sent in the RACH preamble message 406, the scheduled entity 404 applies the timing advance and starts a contention resolution procedure.

Since the preamble is selected randomly by the scheduled entity, if another scheduled entity selects the same preamble in the same RACH resource, a collision may result between the two scheduled entities. Any collisions may then be resolved using the contention resolution procedure. During contention resolution, the scheduled entity 404 transmits an uplink message 410 on the common control channel (CCCH) using the TA and assigned uplink resources. In an example, the uplink message 410 is a Layer 2/Layer 3 (L2/L3) message, such as a Radio Resource Control (RRC) Connection Request message. The uplink message 410 includes an identifier of the scheduled entity 404 for use by the scheduling entity in resolving any collisions. Although other scheduled entities may transmit colliding uplink messages utilizing the TA and assigned uplink resources, these colliding uplink messages will likely not be successfully decoded at the scheduling entity since the colliding uplink messages were transmitted with TAs that were not intended for those scheduled entities.

Upon successfully decoding the uplink message, the scheduling entity 402 transmits a contention resolution message 412 to the scheduled entity 404. The contention resolution message 412 may be, for example, an RRC-Connection Setup message. In addition, the contention resolution message 412 includes the identifier of the scheduled entity 404 that was received in the uplink message 410. The scheduled entity 404, upon receiving its own identity back in the contention resolution message 412, concludes that the random access procedure was successful and completes the RRC connection setup process. Any other scheduled entity receiving the RRC-Connection Setup message 412 with the identity of the scheduled entity 404 will conclude that the random access procedure failed and re-initialize the random access procedure.

Figure 5:
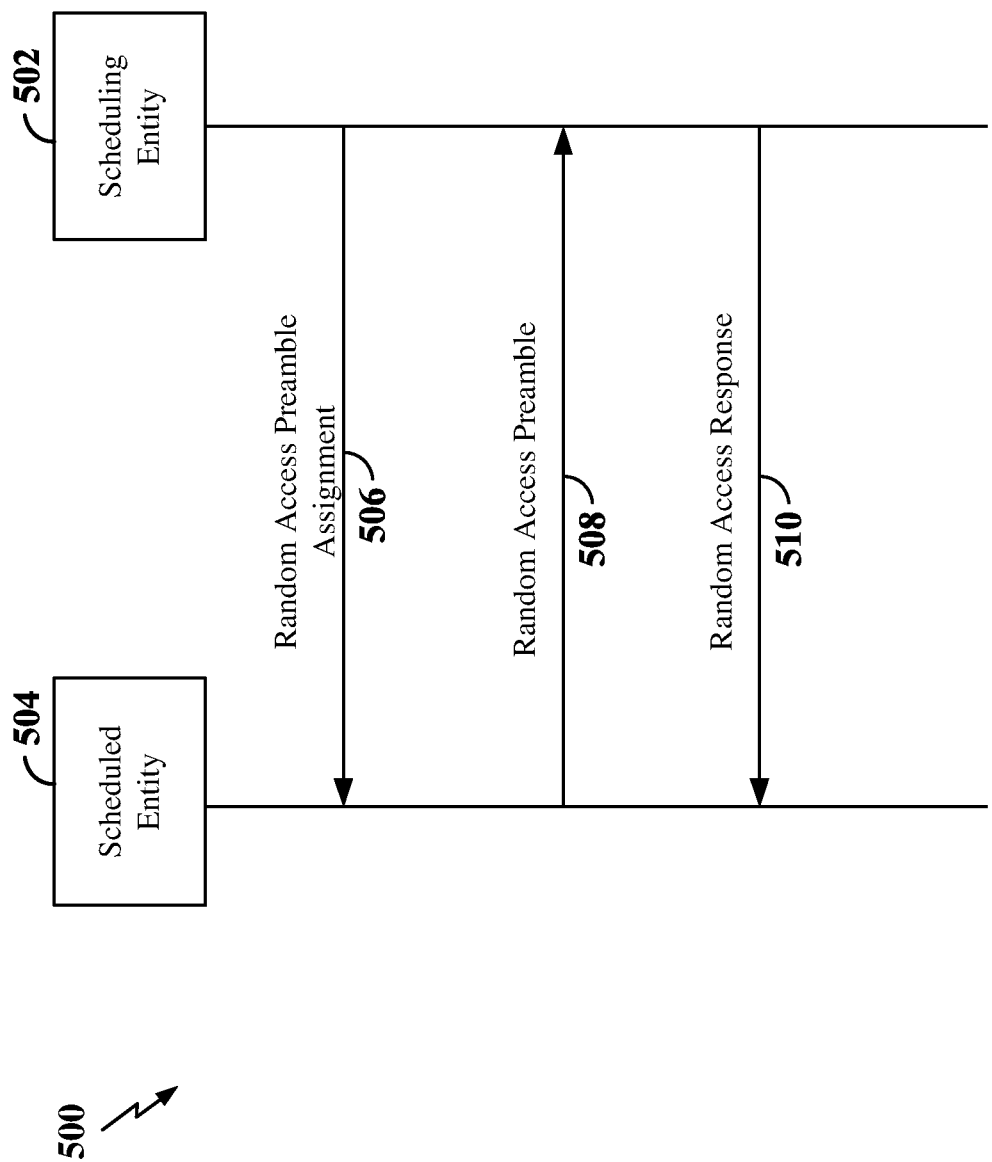
FIG. 5 is a diagram illustrating an example of a non-contention based random access procedure utilizing the RACH.

FIG. 5 is a diagram illustrating an example of a non-contention based random access procedure between a scheduling entity 502 and a scheduled entity 504. The scheduling entity 502 may correspond, for example, to any of the scheduling entities shown in FIGS. 1 and/or 2. In addition, the scheduled entity 504 may correspond, for example, to any of the scheduled entities shown in FIGS. 1 and/or 2.

The non-contention based random access procedure 500 may be used, for example, during handovers, after uplink synchronization loss or positioning of the scheduled entity. The non-contention based random access procedure is initiated by the scheduling entity 502 selecting a preamble from a reserved set of preambles within the cell served by the scheduling entity 502, and transmitting the selected preamble to the scheduled entity 504 in a RACH preamble assignment message 506. In an example, the reserved set of preambles may be separate from the pool of preambles available for random selection in contention based random access. Thus, the reserved set of preambles may be assigned by the scheduling entity in a contention-free manner The scheduled entity 504 may then transmit the assigned preamble to the scheduling entity 502 in a RACH preamble message 508. The scheduling entity 502 may then transmit a random access response (RAR) message 510 on the physical downlink control channel (PDCCH). The RAR message 510 includes an identifier of the preamble sent by the scheduled entity 504, a Timing Advance (TA), a temporary cell radio network temporary identifier (TC-RNTI) or random access (RA) RNTI for the scheduled entity 504 and a grant of assigned uplink resources. Upon receipt of the RAR message 510, the scheduled entity 504 applies the timing advance and may initiate an uplink transmission using the assigned uplink resources.

Figure 6:
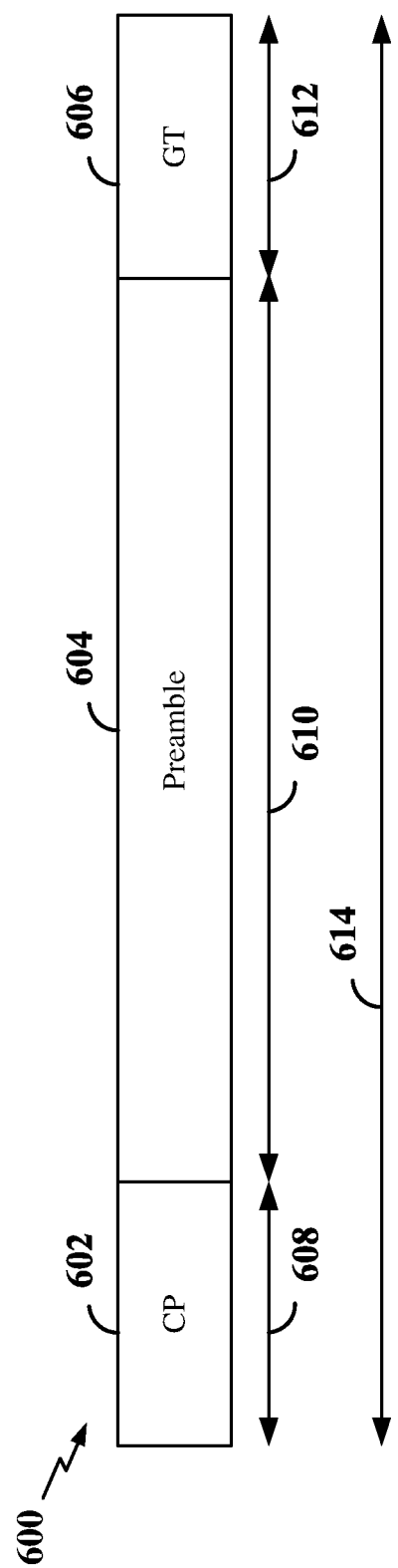
FIG. 6 is a diagram illustrating an example configuration of a RACH signal.

FIG. 6 is a diagram illustrating an example configuration of a RACH signal 600. The RACH signal 600 may correspond to, for example, the RACH preamble message 406 shown in FIG. 4 or the RACH preamble message 508 shown in FIG. 5. The RACH signal 600 may include a cyclic prefix (CP) 602, preamble 604, and guard time (GT) 606. The preamble 604 may be selected by the scheduled entity, for contention based random access, or the scheduling entity, for non-contention based random access, from an available set of preambles.

The CP 602 may include at least a portion of the preamble 604 that is copied to the beginning of the RACH signal 600. In some examples, the CP 602 includes at least an end of the preamble 604. Thus, the CP 602 has a CP duration (CP length) 608 that may be less than a preamble duration (preamble length) 610 of the preamble 604. In the waveform configuration of the RACH signal 600 shown in FIG. 6, a GT duration (GT length) 612 of the GT 606 is set equal to the CP length 608. Since the round-trip time (RTT) of communications between the scheduling entity and each scheduled entity may be different depending on the location of each scheduled entity, the CP length 608 and GT length 612 may each be designed to be equal to at least the maximum RTT that may be experienced by a scheduled entity served by the scheduling entity to ensure that RACH signals received from different scheduled entities may be decoded appropriately. Thus, a RACH signal duration (RACH signal length) 612 of the RACH signal 600 may be set to be equal to the preamble length 610 plus twice the maximum RTT (e.g., the CP length 608 plus the GT length 612, where each of the CP length 608 and the GT length 612 are equal to the maximum RTT).

Figure 7:
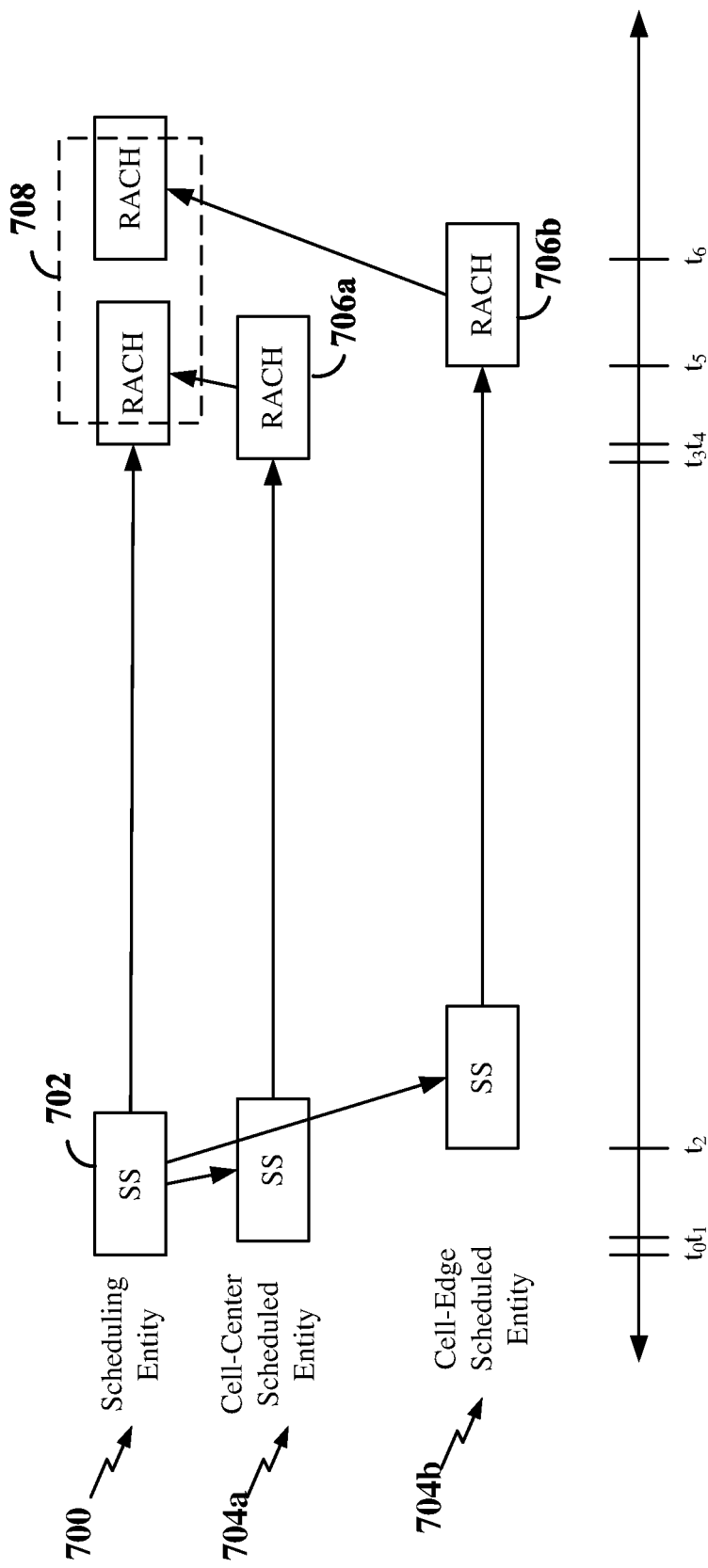
FIG. 7 is a diagram illustrating an example of the timing of RACH signals transmitted by various scheduled entities.

FIG. 7 is a diagram illustrating an example of the timing of RACH signals transmitted by various scheduled entities according to some aspects of the disclosure. To gain initial access to the wireless network or in response to link/beam failure in millimeter wave (mmW) systems, a scheduled entity 704a or 704b may generate and transmit a random access signal to a scheduling entity 700 on an uplink random access channel (RACH). For example, a cell-center scheduled entity 704a (e.g., a scheduled entity located at or near the center of the cell served by the scheduling entity) may transmit a first RACH signal 706a, while a cell-edge scheduled entity 704b (e.g. a scheduled entity located at or near the edge of the cell) may transmit a second RACH signal 706b.

In the example shown in FIG. 7, the RACH signals 706a and 706b may be transmitted in response to receiving a synchronization signal (SS) block 702 broadcast by the scheduling entity 700 within the cell. The SS block 702 may include, for example, a Primary Synchronization Signal (PSS), Secondary Synchronization Signal (SS) and/or a Physical Broadcast Control Channel (PBCH) that conveys minimum system information. Each scheduled entity 704a and 704b may be configured to transmit its respective RACH signal 706a and 706b after a predetermined time (delay) from receiving the SS block 702, which may be set based upon a maximum round-trip time (RTT) within the cell. In some examples, the RACH transmission time may be indicated in the SS block 702. With knowledge of the RACH transmission time, the scheduling entity 700 may identify an observation window 708 within which the scheduling entity may receive and process RACH signals 706a and 706b.

Since the RTT of the cell-center scheduled entity 704a is less than the RTT of the cell-edge scheduled entity 704b, the cell-center scheduled entity 704a may receive the SS block 702 prior to the cell-edge scheduled entity 704b, and therefore, may generate and transmit the RACH signal 706a prior to transmission of the RACH signal 706b by the cell-edge scheduled entity 704b. In the example shown in FIG. 7, the scheduling entity 700 may transmit the SS block 702 at an initial time $t_0$. The SS block 702 may be received by the cell-center scheduled entity 704a at time $t_1$ and by the cell-edge scheduled entity 704b at a later time $t_2$, where the difference between $t_1$ and $t_2$ is based on the difference between the RTT experienced by each of the scheduled entities (e.g., $(t_2-t_1)=\frac{1}{2}(RTT_{cell-edge}-RTT_{cell-center})$). The cell-center scheduled entity 704a may then generate and transmit the RACH signal 706a at time $t_3$, which may be received by the scheduling entity 700 at time $t_4$, while the cell-edge scheduled entity 704b may generate and transmit the RACH signal 706b at a later time $t_5$, which may be received by the scheduling entity 700 at time $t_6$. The difference between the times $t_4$ and $t_6$ at which the scheduling entity 700 receives each of the RACH signals may, therefore, be equal to the difference between the RTTs experienced by each of the scheduled entities (e.g., $(t_6-t_4)=(RTT_{cell-edge}-RTT_{cell-center})$).

Scheduling entities 700 within legacy (e.g., LTE or other 4G networks) may set the CP length and GT length to be at least equal to the maximum RTT experienced by a scheduled entity within the cell (e.g., the RTT experienced by the cell-edge scheduled entity 704b) to ensure that at least one preamble sequence (e.g., the preamble or a combination of the CP and the beginning portion of the preamble) from each scheduled entity falls within the observation window 708. Therefore, the scheduling entity 700 may decode a RACH signal (e.g., RACH signal 706a or 706b) transmitted from a scheduled entity located anywhere within the cell.

Figure 8:
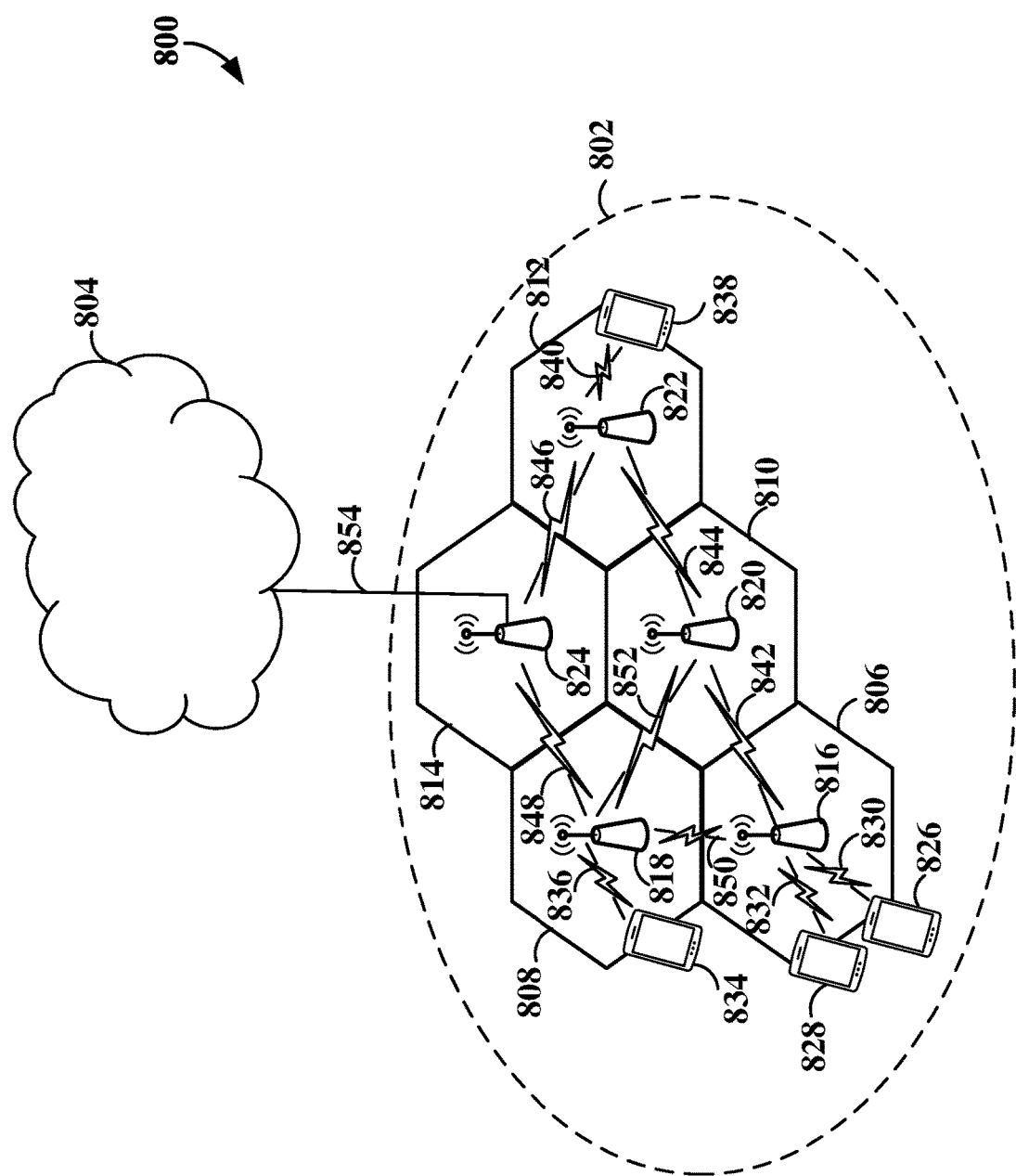
FIG. 8 is a schematic diagram providing a high-level illustration of one example of a network configuration including an Integrated-Access-Backhaul (IAB) network.

Random access procedures may be utilized not only within a radio access network (e.g., between a base station and a UE), but also within an Integrated-Access-Backhaul (IAB) network for initial access after installation of an IAB node or after link or beam failure of an IAB node. FIG. 8 is a schematic diagram providing a high-level illustration of one example of a network configuration 800 that may be utilized in some aspects of the disclosure. In this illustration, a communication network 802, such as an IAB network, is coupled to a remote network 804, such as a main backhaul network or mobile core network. In such an IAB network 802, the wireless spectrum may be used for both access links and backhaul links The IAB network 802 may be similar to the radio access network 200 shown in FIG. 2, in that the IAB network 802 may be divided into a number cells 806, 808, 810, 812, and 814, each of which may be served by a respective IAB node 816, 818, 820, 822, and 824. Each of the IAB nodes 816-824 may be an access point, base station (BS), eNB, gNB, or other node that utilizes wireless spectrum (e.g., the radio frequency (RF) spectrum) to support access for one or more UEs located within the cells 806-814 served by the IAB nodes. In the example shown in FIG. 5, IAB node 816 communicates with UEs 826 and 828 via wireless access links 830 and 832, IAB node 818 communicates with UE 834 via wireless access link 836, and IAB node 822 communicates with UE 838 via wireless access link 840.

The IAB nodes 816-824 are further interconnected via one or more wireless backhaul links 842, 844, 846, 848, 850, and 852. Each of the wireless backhaul links 842-852 may utilize the same wireless spectrum (e.g., the radio frequency (RF) spectrum) as the access links 830-840 to backhaul access traffic to/from the remote network 804. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 802. In the example shown in FIG. 8, IAB node 816 communicates with IAB node 820 via wireless backhaul link 842, IAB node 820 communicates with IAB node 822 via wireless backhaul link 844, IAB node 822 communicates with IAB node 824 via wireless backhaul link 846, IAB node 824 communicates with IAB node 818 via wireless backhaul link 848, IAB node 818 communicates with IAB node 816 via wireless backhaul link 850, and IAB node 818 communicates with IAB node 820 via wireless backhaul link 852. As shown in FIG. 8, each IAB node 816-824 may be connected via respective wireless backhaul links 842-852 to two or more other IAB nodes for robustness.

Some or all of the IAB nodes 816-824 may also be connected via wired backhaul links (e.g., fiber, coaxial cable, Ethernet, copper wires, etc.) and/or microwave backhaul links. Thus, the IAB network 802 may support both wired/microwave and wireless backhaul traffic. At least one of the IAB nodes (e.g., IAB node 824) may be a border IAB node that also provides a communication link 854 to the remote network 804. For example, the border IAB node 824 may include a wired (e.g., fiber, coaxial cable, Ethernet, copper wires), microwave, or other suitable link 854 to the remote network 804.

To facilitate wireless communication between the IAB nodes 816-824 and between the IAB nodes 816-824 and the UEs served by the IAB nodes 816-824, each IAB node 816-824 may include both access network functionality (ANF) and UE functionality (UEF) to allow each IAB node to operate as a scheduling entity and a scheduled entity. For example, the ANF enables an IAB node 816, 818, 820, 822, or 824 to operate as a scheduling entity to communicate with one or more UEs located within the cell 806, 808, 810, 812, or 814 served by the IAB node via respective access links. The ANF may further enable an IAB node 816-824 to operate as a scheduling entity to facilitate (e.g., schedule) communication between one or more other IAB nodes within the IAB network 802 via respective backhaul links. The UEF, on the other hand, may allow each IAB node 816-824 to also operate as a scheduled entity (e.g., as a UE) to communicate with one or more other IAB nodes within the IAB network 802 via the respective wireless backhaul links Thus, the combination of the UEF and ANF within each IAB node 816-824 enables the IAB nodes to utilize the same wireless spectrum (e.g., the radio frequency (RF) spectrum) to transmit access traffic to/from UEs and to then backhaul that access traffic to/from the remote network 804. For example, to backhaul access traffic to/from IAB node 818, the UEF within IAB node 818 may communicate with the ANF within IAB node 820 to transmit backhaul access traffic via wireless backhaul link 842, the UEF within IAB node 820 may communicate with the ANF within IAB node 822 to transmit the backhaul access traffic via wireless backhaul link 844, and the UEF within IAB node 822 may communicate with the ANF within IAB node 824 to transmit the backhaul access traffic via wireless backhaul link 846. In this example, IAB nodes 820 and 822 may each operate as both a scheduling entity and a scheduled entity to backhaul access traffic to/from IAB node 816. As such, communication between a pair of IAB nodes may be individually scheduled by one of the IAB nodes within the pair.

In other examples, an IAB node may schedule wireless backhaul communications between other pairs of IAB nodes. For example, IAB node 824 may operate as the scheduling entity for the IAB network 802, while IAB nodes 816, 820, and 822 each operate as a scheduled entity to backhaul access traffic to/from IAB node 816. In this example, IAB node 824 may schedule wireless backhaul communications between each of the pairs of IAB nodes (e.g., between IAB node 816 and IAB node 820, between IAB node 820 and IAB node 822, and between IAB node 822 and IAB node 824). As another example, IAB node 822 may operate as a scheduling entity to schedule wireless backhaul communications between IAB nodes 816 and 820 and also between IAB node 820 and IAB node 822. IAB node 822 may then operate as a scheduled entity to allow IAB node 824 to schedule wireless backhaul communications therebetween.

Within such a backhaul system, the distance between IAB nodes (e.g., between IAB nodes 816 and 820) may be greater than the distance between a particular IAB node (e.g., IAB node 816) and a cell-edge UE (e.g., UE 826), which may lead to a longer RTT for communications between IAB nodes. In addition, since the potential number of IAB nodes that may be connected to a particular IAB node via wireless backhaul links may be less than the potential number of UEs that may be connected to that particular IAB node, a shorter preamble for RACH signals between IAB nodes may be sufficient. However, due to the longer RTT, with the current RACH configuration, the CP length and GT length may need to be longer within IAB networks. The longer CP and GT lengths may extend the time for completing the initial access process for an IAB node, which may result in undesired data transmission delays. In addition, the longer CP and GT lengths may increase the transmit power, thereby causing inefficiencies within IAB nodes.

Various aspects of the present disclosure are directed to RACH configurations within an IAB network 802 and/or within a wireless communication system, such as one specified under standards for a 5G or New Radio (NR) radio access network (e.g., the wireless communication system 100 shown in FIG. 1 and/or RAN 200 shown in FIG. 2). In some aspects of the disclosure, an estimated timing advance value is utilized to select a RACH configuration for a RACH signal to be transmitted from a scheduled entity to a scheduling entity. In some examples, the RACH configuration is selected to modify the transmission timing of the RACH signal based on the timing advance value and/or to modify a waveform configuration of the RACH signal based on the timing advance value.

Figure 9:
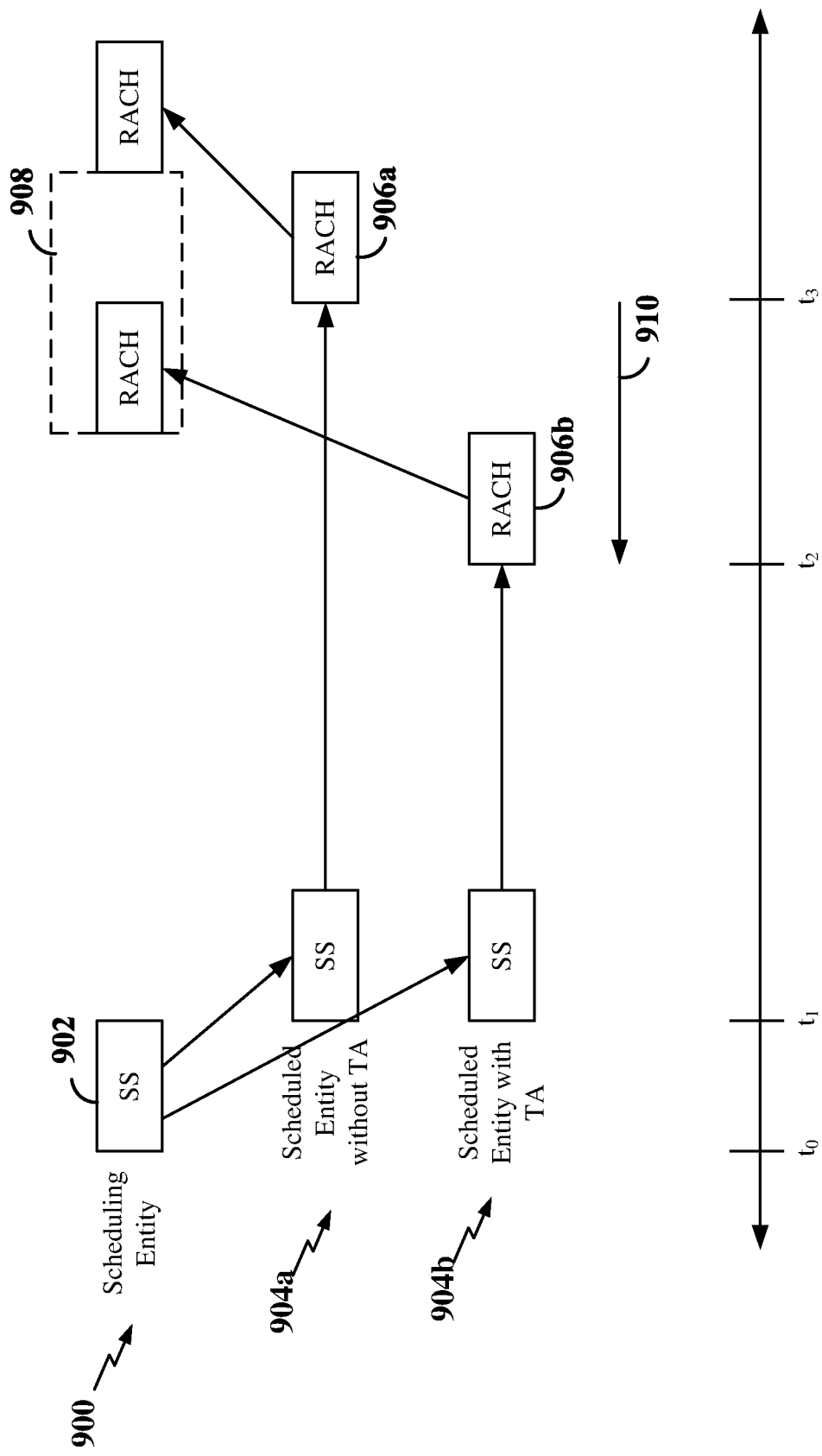
FIG. 9 is a diagram illustrating another example of the timing of RACH signals transmitted by scheduled entities utilizing a timing advance value.

FIG. 9 is a diagram illustrating another example of the timing of RACH signals transmitted by scheduled entities utilizing a timing advance value to modify at least the transmission time of one or more RACH signals according to some aspects of the disclosure. In the example shown in FIG. 9, a scheduling entity 900 may broadcast a signal 902 (e.g., an SS block, physical broadcast channel (PBCH) or other signal that conveys minimum system information), referred to herein as an SS block, within a cell or IAB network served by the scheduling entity. The SS block 902 may be received by two scheduled entities 904a and 904b, each located at the same distance from the scheduling entity 900. Therefore, the SS block 902 may be received substantially simultaneously by each of the scheduled entities 904a and 904b. In the example shown in FIG. 9, the SS block 902 may be transmitted by the scheduling entity 900 at an initial time $t_0$ and received by each of the scheduled entities 904a and 904b at time $t_1$.

In response to receiving the SS block 902, each of the scheduled entities 904a and 904b may generate and transmit a respective RACH signal 906a and 906b to the scheduling entity 900. In some examples, the scheduled entities 904a and 904b may be IAB nodes that are located beyond the cell edge of the cell served by the scheduling entity 900. Thus, when utilizing a RACH configuration in which the CP length and GT length are set equal to the maximum RTT within the cell and an observation window 908 is established based upon the maximum RTT, the RACH signal 906a transmitted by scheduled entity 904a at time $t_3$ (corresponding to the predetermined RACH transmission time) may not be received within the observation window 908 of the scheduling entity.

In various aspects of the disclosure, instead of extending the CP length and GT length (and modifying the observation window 908), a RACH configuration of the RACH signal 906b may be selected by the scheduled entity 904b to modify the transmission timing of the RACH signal 906b. In some examples, the RACH configuration may be selected utilizing an estimate of a timing advance value 910 for earlier transmission of the RACH signal 906b. In the example shown in FIG. 9, the timing advance value 910 may be set equal to the estimated or exact RTT between the scheduled entity 904b and the scheduling entity 900. Thus, the scheduled entity 904b may transmit the RACH signal 906b at an earlier time $t_2$ corresponding to a difference between the predetermined RACH transmission time (e.g., $t_3$) and the estimated timing advance value 910. As a result, the RACH signal 906b transmitted with the RACH configuration utilizing the timing advance value 910 may be received within the observation window 908 of the scheduling entity 900.

In some examples, the estimated timing advance value to utilize for RACH signals may be provided to the scheduled entity 904b. For example, the estimated timing advance may be installed on the scheduled entity 904b or received from either the scheduling entity 900 (e.g., within the SS block 902) or another node (e.g., another gNB or IAB node). In a particular example, the scheduled entity 904b may receive the estimated timing advance value from a serving gNB or ANF when performing a neighbor search or through dual connectivity (e.g., via sub-6 GHz or LTE) to the same or a different gNB or ANF. In some examples, the gNB or IAB node providing the estimated timing advance value may utilize a different carrier frequency or radio access technology (RAT) than that utilized by the scheduled entity 904b to transmit the RACH signal 906b to the scheduling entity 900.

In some examples, the estimated timing advance value may be determined based on the locations of the scheduling entity 900 and scheduled entity 904b or the link distance between the scheduling entity 900 and scheduled entity 904b. For example, the scheduled entity 904b may be an IAB node that is installed with the locations of the scheduling entity 900 and scheduled entity 904b or the link distance between the scheduling entity 900 and scheduled entity 904b. The scheduled entity 904b may also receive the location of the scheduling entity 900 or link distance between the scheduled entity 904b and the scheduling entity 900 from the scheduling entity 900 (e.g., within the SS block 902) or from another node (e.g., another gNB or IAB node) within the network. For example, the scheduled entity 904b may receive the location of the scheduling entity 900 or the link distance between the scheduling entity 900 and the scheduled entity 904b from a serving gNB or ANF when performing a neighbor search or through dual connectivity (e.g., via sub-6 GHz or LTE) to the same or a different gNB or ANF. In some examples, the other gNB or IAB node may utilize a different carrier frequency or radio access technology (RAT) than that utilized by the scheduled entity 904b to transmit the RACH signal 906b to the scheduling entity 900. In examples where the scheduled entity 904b is a UE, the scheduled entity 904b may receive the location of the scheduling entity 900 from the scheduling entity 900 or another node and may also calculate its own location utilizing any locating mechanism, such as Global Positioning System (GPS).

In some examples, the timing advance value 910 may be estimated utilizing the SS block 902. For example, the scheduled entity 904b may measure a path loss of the SS block 902 and utilize the measured path loss to estimate the timing advance value. In this example, the SS block 902 may further include one or more path loss parameters that may be used for path loss measurement and/or mapping information for mapping the measured path loss to an estimated timing advance value. For example, the SS block 902 may include a look-up table mapping ranges of measured path loss values to estimated timing advance values. As another example, the SS block 902 may include one or more mapping parameters that may be utilized in a mapping formula for mapping the measured path loss to the estimated timing advance value. Examples of mapping parameters may include, but are not limited to, a path loss exponent, a constant, or a back-off value).

In some examples, the timing advance value 910 may be estimated using a time stamp within the SS block 902. For example, if the scheduling entity 900 and scheduled entity 904b share the same reference time (e.g., via GPS), the RTT (and thus, the timing advance value) may be estimated by comparing the time stamp within the received SS block 902 to the current system time. In some examples, the estimated timing advance value 910 may be stored within the scheduled entity 904b, scheduling entity 900 or another node for later use/retrieval by the scheduled entity 904. For example, in a backhaul network, the IAB nodes may store historical data including the estimated timing advance values to utilize for RACH signals between each pair of IAB nodes that may wirelessly communicate utilizing direct wireless backhaul links In some examples, the estimated timing advance value may correspond to an estimated minimum RTT between the scheduled entity 904b and the scheduling entity 900. The estimated minimum RTT may be the exact RTT between the scheduled entity 904b and the scheduling entity 900 or another estimate of a minimum RTT to utilize for RACH signals between the scheduled entity 904b and the scheduling entity 900. In examples where the scheduled entity 904b is an IAB node, the estimated minimum RTT may be determined based on a minimum distance between two IAB nodes within the network.

The RACH configuration utilized for the RACH signal may therefore include not only a modified transmission timing based the estimated minimum RTT (e.g., utilizing the timing advance value equal to the minimum RTT), but also a modified waveform configuration. In some examples, the modified waveform configuration may include a reduced CP length and a reduced GT length. For example, the CP length and the GT length may each be set equal to a difference between an estimated maximum RTT for communications between the scheduled entity and the scheduling entity and the estimated minimum RTT instead of the difference between the maximum RTT and zero RTT (which is simply equal to the maximum RTT). The estimated maximum RTT may be the maximum RTT for cell-edge UEs within the cell or a maximum RTT corresponding to a maximum distance between IAB nodes that may directly communicate utilizing wireless backhaul links.

Figure 10:
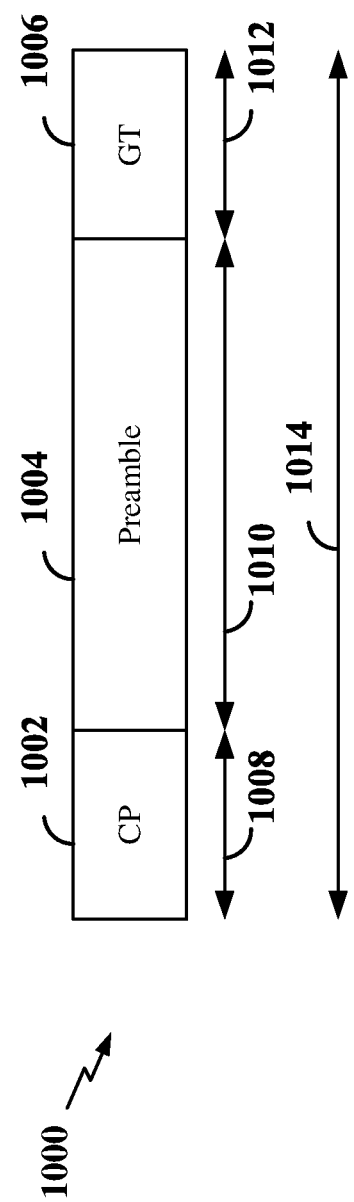
FIG. 10 is a diagram illustrating another example configuration of a RACH signal based on an estimated timing advance value.

FIG. 10 is a diagram illustrating another example configuration of a RACH signal based on an estimated timing advance (TA) value according to some aspects of the disclosure. As can be seen by comparison of the examples shown in FIG. 6 and FIG. 10, the CP length 1008 of the CP 1002 and the GT length 1012 of the GT 1006 of the RACH signal 1000 shown in FIG. 10 are reduced. In some examples, the CP length 1008 and the GT length 1012 may each be set equal to $RTT_{max} - RTT_{min}$, with the TA value=$RTT_{min}$, thus shortening the overall RACH signal length 1014. In addition, within an IAB network, since the potential number of IAB nodes that may be connected to a particular IAB node via wireless backhaul links may be less than the potential number of UEs that may be connected to that particular IAB node, a shorter preamble 1004 may be used. Thus, the preamble length 1010 of the preamble 1004 may be reduced in comparison to that shown in FIG. 6.

Figure 11:
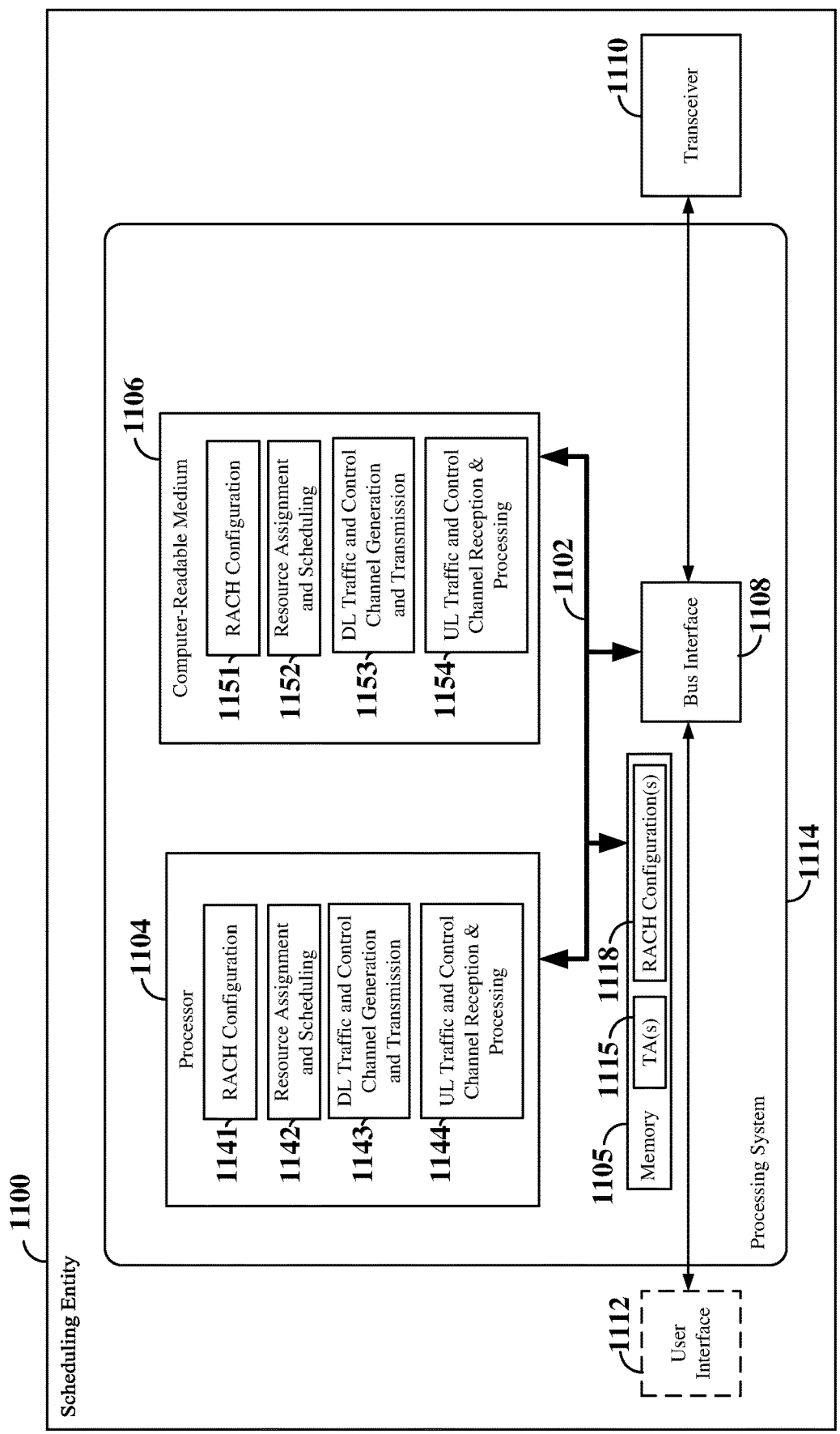
FIG. 11 is a block diagram illustrating an example of a hardware implementation for a scheduling entity employing a processing system.

FIG. 11 is a block diagram illustrating an example of a hardware implementation for a scheduling entity 1100 employing a processing system 1114. For example, the scheduling entity 1100 may be a base station (e.g., eNB, gNB), IAB node, or other scheduling entity as illustrated in any one or more of FIGS. 1, 2, 4, 5, and 7-9.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described below.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium (e.g., air). Depending upon the nature of the apparatus, a user interface 1112 (e.g., keypad, display, speaker, microphone, joystick, touchscreen) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include random access channel (RACH) configuration circuitry 1141 configured to determine a RACH configuration 1118 of a RACH signal transmitted by a scheduled entity. In some examples, the RACH configuration circuitry 1141 may determine the RACH configuration 1118 of the RACH signal based on an estimated timing advance value 1115 utilized by the scheduled entity. In some examples, the estimated timing advance value 1115 may be predetermined (known) and stored within, for example, memory 1105. In other examples, the estimated timing advance value 1115 may be calculated by the RACH configuration circuitry 1141. For example, the RACH configuration circuitry 1141 may calculate the estimated timing advance value 1115 based on the locations of the scheduling entity 1100 and the scheduled entity or the link distance between the scheduling entity and the scheduled entity.

In some examples, the RACH configuration circuitry 1141 may receive the estimated timing advance, location of the scheduled entity, or link distance between the scheduling entity 1100 and the scheduled entity from the scheduled entity or another node (e.g., another gNB or IAB node) within the network. For example, the scheduled entity may be an IAB node that previously transmitted the estimated timing advance, location, or link distance to the scheduling entity 1100 (directly or via another gNB or IAB node), and the RACH configuration circuitry 1141 may store the estimated timing advance, location, or link distance within, for example, memory 1105 for subsequent use after a link or beam failure between the scheduling entity 1100 and the scheduled entity.

In some examples, the RACH configuration 1118 is indicative of a waveform configuration of the RACH signal transmitted by the scheduled entity based on the estimated timing advance value 1115 utilized by the scheduled entity to transmit the RACH signal. In some examples, the waveform configuration may include a CP length and a GT length. For example, the CP length and the GT length may each be set equal to a difference between an estimated maximum RTT for communications between the scheduled entity and the scheduling entity and an estimated minimum RTT for communications between the scheduled entity and the scheduling entity. The estimated maximum RTT may be the maximum RTT for cell-edge scheduled entities within the cell or a maximum RTT corresponding to a maximum distance between IAB nodes that may directly communicate utilizing wireless backhaul links. The estimated minimum RTT may be the exact RTT between the scheduled entity and the scheduling entity or another estimate of a minimum RTT. In examples where the scheduled entity is an IAB node, the minimum RTT may correspond to a minimum distance between two IAB nodes within the network.

The RACH configuration circuitry 1141 may further be configured to generate and transmit a signal, such as a Synchronization Signal (SS) block, PBCH or other signal that conveys minimum system information, for use by the scheduled entity in estimating the timing advance value associated with the RACH configuration. In some examples, the signal may include the link distance between the scheduling entity and the scheduled entity, the location of the scheduling entity (and possibly the location of the scheduled entity), or the estimated timing advance value for the scheduled entity to utilize in transmitting the RACH signal. In some examples, the signal may include one or more path loss parameters that may be used for path loss measurement of the signal and/or mapping information for mapping the measured path loss to an estimated timing advance value. In some examples, the signal may include a time stamp for use by the scheduled entity in estimating the timing advance value. In some examples, the signal may be transmitted using a different carrier frequency or radio access technology (RAT) from the transmission of the RACH signal.

The RACH configuration circuitry 1141 may further be configured to identify different RACH configurations 1118 for different scheduled entities based on different timing advance (TA) values 1115. For example, the RACH configuration circuitry 1141 may identify a first RACH configuration of a first RACH signal transmitted by a first scheduled entity, and a second RACH configuration of a second RACH signal transmitted by a second scheduled entity, where the first and second RACH configurations are different (e.g., the first RACH configuration utilizes a first timing advance value and a first CP and GT length, while the second RACH configuration utilizes a second timing advance value and a second CP and GT length). In some examples, the different RACH configurations may be associated with different types of scheduled entities. For example, a first RACH configuration may be utilized for UE devices, while a second RACH configuration may be utilized for IAB devices.

The RACH configuration circuitry 1141 may further be configured to identify the timing advance (TA) value or information for use in estimating the TA value between two other wireless nodes (e.g., between two other IAB nodes or between another scheduling entity and a UE) in the wireless communication network. For example, the RACH configuration circuitry 1141 may be configured to identify the locations of one or both of the other wireless nodes, the link distance between two other wireless nodes, and/or the minimum distance between two IAB nodes in a wireless backhaul network. In some examples, the location(s), link distance(s), and/or minimum distance may be stored, for example, in memory 1105. The RACH configuration circuitry 1141 may further access historical data (e.g., stored, for example, in memory 1105) including the estimated timing advance values to utilize for RACH signals between each pair of IAB nodes that may wirelessly communicate utilizing direct wireless backhaul links. The RACH configuration circuitry 1141 may further be configured to execute RACH configuration software 1151 included on the computer-readable medium 1106 to implement one or more functions described herein.

The processor 1104 may further include resource assignment and scheduling circuitry 1142, configured to generate, schedule, and modify a resource assignment or grant of time-frequency resources (e.g., a set of one or more resource elements). For example, the resource assignment and scheduling circuitry 1142 may schedule time-frequency resources within a plurality of time division duplex (TDD) and/or frequency division duplex (FDD) slots to carry user data traffic and/or control information to and/or from multiple UEs (scheduled entities).

In various aspects of the disclosure, the resource assignment and scheduling circuitry 1142 may further schedule transmission of a signal (e.g., an SS block) for use by a scheduled entity in estimating a timing advance value to be utilized for a RACH signal transmission. The resource assignment and scheduling circuitry 1142 may further schedule uplink resources for use by the scheduled entity in transmitting the RACH signal. The resource assignment and scheduling circuitry 1142 may further be configured to execute resource assignment and scheduling software 1152 included on the computer-readable medium 1106 to implement one or more functions described herein.

The processor 1104 may further include downlink (DL) traffic and control channel generation and transmission circuitry 1143, configured to generate and transmit downlink user data traffic and control channels within one or more slots. The DL traffic and control channel generation and transmission circuitry 1143 may operate in coordination with the resource assignment and scheduling circuitry 1142 to place the DL user data traffic and/or control information onto a time division duplex (TDD) or frequency division duplex (FDD) carrier by including the DL user data traffic and/or control information within one or more slots in accordance with the resources assigned to the DL user data traffic and/or control information.

In various aspects of the disclosure, the DL traffic and control channel generation and transmission circuitry 1143 may transmit a signal (e.g., an SS block) for use by a scheduled entity in estimating a timing advance value to utilize for a RACH signal transmission. The DL traffic and control channel generation and transmission circuitry 1143 may be further configured to generate and transmit a signal containing the TA value or information for use in estimating the TA value between two other wireless nodes (e.g., between two other IAB nodes or between another scheduling entity and a UE). For example, the scheduling entity 1100 may function as an ANF (towards a first wireless node, such as an IAB node or UE) to instruct the first wireless node to estimate the timing advance value with respect to a second wireless node (e.g., another IAB node or gNB) and as a UEF (towards the second wireless node) to provide the estimated timing advance value thereto. As another example, the scheduling entity 1100 may provide the TA value between a scheduled entity and another scheduling entity to the scheduled entity during a cell search conducted by the scheduled entity. The DL traffic and control channel generation and transmission circuitry 1143 may further be configured to execute DL traffic and control channel generation and transmission software 1153 included on the computer-readable medium 1106 to implement one or more functions described herein.

The processor 1104 may further include uplink (UL) traffic and control channel reception and processing circuitry 1144, configured to receive and process uplink control channels and uplink traffic channels from one or more scheduled entities. For example, the UL traffic and control channel reception and processing circuitry 1144 may be configured to receive uplink user data traffic from one or more scheduled entities. The UL traffic and control channel reception and processing circuitry 1144 may further be configured to receive UL control information from a scheduled entity. In various aspects of the disclosure, the UL traffic and control channel reception and processing circuitry 1144 may be configured to receive a RACH signal from a scheduled entity and to access the RACH configuration circuitry 1141 to determine the RACH configuration of the received RACH signal for processing thereof. The UL traffic and control channel reception and processing circuitry 1144 may further be configured to receive an estimated timing advance (TA) value associated with the scheduled entity from the scheduled entity or another node (e.g., another gNB or IAB node) within the network and to store the TA value in memory 1105.

In general, the UL traffic and control channel reception and processing circuitry 1144 may operate in coordination with the resource assignment and scheduling circuitry 1142 to schedule UL user data traffic transmissions, DL user data traffic transmissions and/or DL user data traffic retransmissions in accordance with the received UL control information. The UL traffic and control channel reception and processing circuitry 1144 may further be configured to execute UL traffic and control channel reception and processing software 1154 included on the computer-readable medium 1106 to implement one or more functions described herein.

Figure 12:
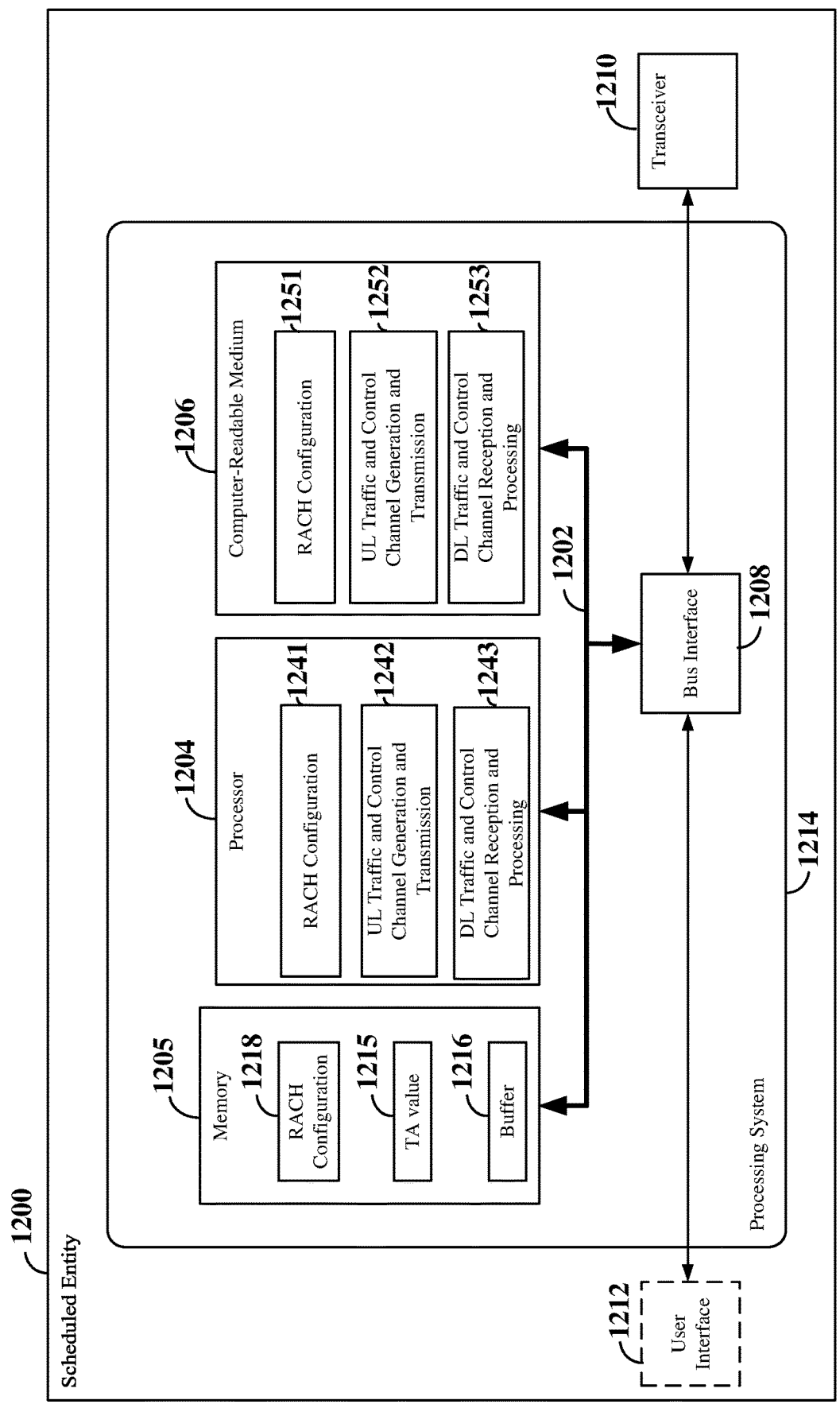
FIG. 12 is a block diagram illustrating an example of a hardware implementation for a scheduled entity employing a processing system.

FIG. 12 is a conceptual diagram illustrating an example of a hardware implementation for an exemplary scheduled entity 1200 employing a processing system 1214. In accordance with various aspects of the disclosure, an element, or any portion of an element, or any combination of elements may be implemented with a processing system 1214 that includes one or more processors 1204. For example, the scheduled entity 1200 may be a user equipment (UE), IAB node, or other type of scheduled entity as illustrated in FIGS. 1, 2, 4, 5, and 7-9.

The processing system 1214 may be substantially the same as the processing system 1114 illustrated in FIG. 11, including a bus interface 1208, a bus 1202, memory 1205, a processor 1204, and a computer-readable medium 1206. Furthermore, the scheduled entity 1200 may include an optional user interface 1212 and a transceiver 1210 substantially similar to those described above in FIG. 11. That is, the processor 1204, as utilized in a scheduled entity 1200, may be used to implement any one or more of the processes described below and illustrated in the various figures.

In some aspects of the disclosure, the processor 1204 may include RACH configuration circuitry 1241 configured to estimate a timing advance (TA) value 1215 for communicating with a scheduling entity and select a RACH configuration 1217 utilizing the timing advance value 1215. For example, the RACH configuration circuitry 1241 may select a RACH configuration 1218 including a modified transmission timing of a RACH signal and/or a modified waveform configuration of the RACH signal utilizing the estimated timing advance value 1215.

In some examples, the estimated timing advance value 1215 may be stored within, for example, memory 1205, and may be retrieved by the RACH configuration circuitry 1241. For example, the estimated timing advance value 1215 may be originally installed in the memory 1205 or may be received from either the scheduling entity or another node and stored in the memory 1205. For example, in a backhaul network, one or more of the IAB nodes may store historical data including estimated timing advance values between respective pairs of IAB nodes or a minimum estimated timing advance value (e.g., based on a minimum distance between IAB nodes), and may provide these estimated timing advance values to other IAB nodes in the IAB network.

In some examples, the RACH configuration circuitry 1241 may estimate the timing advance value 1215 based on the locations of the scheduling entity and scheduled entity 1200 or the link distance between the scheduling entity and scheduled entity 1200. For example, the locations of the scheduling entity and scheduled entity may be stored within, for example, memory 1205. In some examples, the locations or link distance may be originally installed in the memory 1205 or may be received from either the scheduling entity or from another node and stored in the memory 1205. In examples where the scheduled entity 1200 is a UE, the scheduled entity may calculate its own location utilizing any locating mechanism, such as Global Positioning System (GPS).

In examples where information for use in estimating the timing advance value (e.g., the location(s) and/or link distance) is received from a third node (e.g., another scheduling entity or IAB node), the third node may function as an ANF (towards the scheduled entity) to instruct the scheduled entity 1200 to estimate the timing advance value with respect to the scheduling entity and as a UEF (towards the scheduling entity) to provide the estimated timing advance value to the scheduling entity. For example, the scheduled entity 1200 may receive the information for use in estimating the timing advance value from a serving gNB or ANF when performing a neighbor search (to identify the scheduling entity) or through dual connectivity (e.g., via sub-6 GHz or LTE) to a different gNB or ANF. In some examples, the other gNB or IAB node may utilize a different carrier frequency or radio access technology (RAT) than that utilized by the scheduled entity 1200 to transmit the RACH signal to the scheduling entity.

In some examples, the RACH configuration circuitry 1241 may estimate the timing advance value 1215 utilizing a signal (e.g., an SS block, PBCH or other signal that conveys minimum system information) broadcast by the scheduling entity. For example, the RACH configuration circuitry 1241 may measure a path loss of the SS block and utilize the measured path loss to estimate the timing advance value. In this example, the SS block may further include one or more path loss parameters that may be used for path loss measurement and/or mapping information for mapping the measured path loss to an estimated timing advance value.

In some examples, the RACH configuration circuitry 1241 may estimate the timing advance value 1215 using a time stamp within the received SS block. For example, if the scheduling entity and scheduled entity share the same reference time (e.g., via GPS), the RTT (and thus, the timing advance value) may be estimated by comparing the time stamp within the received SS block to the current system time on the scheduled entity.

In some examples, the RACH configuration circuitry 1241 may select a RACH configuration 1218 that includes a modified transmission time of the RACH signal. For example, the modified transmission time may be calculated utilizing the TA value 1215 for earlier transmission of the RACH signal. In this example, the TA value 1215 may be set equal to the estimated or exact RTT between the scheduled entity 1200 and the scheduling entity, and the transmission time of the RACH signal may be calculated as a difference between a predetermined RACH transmission time (e.g., as set by the scheduling entity) and the estimated TA value 1215.

In some examples, the RACH configuration circuity 1241 may select a RACH configuration 1218 that includes a modified waveform configuration. In some examples, the modified waveform configuration may include a reduced CP length and a reduced GT length. For example, the CP length and the GT length may each be set equal to a difference between an estimated maximum RTT for communications between the scheduled entity and the scheduling entity and an estimated minimum RTT for communications between the scheduled entity and the scheduling entity. The estimated maximum RTT may be the maximum RTT for cell-edge scheduled entities within the cell or a maximum RTT corresponding to a maximum distance between IAB nodes that may directly communicate utilizing wireless backhaul links. The estimated minimum RTT may be the exact RTT between the scheduled entity 1200 and the scheduling entity or another estimate of a minimum RTT. In examples where the scheduled entity is an IAB node, the minimum RTT may correspond to a minimum distance between two IAB nodes within the network. The RACH configuration circuitry 1241 may further be configured to execute RACH configuration software 1251 included on the computer-readable medium 1206 to implement one or more functions described herein.

The processor 1204 may further include uplink (UL) traffic and control channel generation and transmission circuitry 1242, configured to generate and transmit uplink control/feedback/acknowledgement information on an UL control channel. For example, the UL traffic and control channel generation and transmission circuitry 1242 may be configured to generate and transmit uplink user data traffic on an UL traffic channel (e.g., a PUSCH) in accordance with an uplink grant. In addition, the UL traffic and control channel generation and transmission circuitry 1242 may be configured to generate and transmit an uplink control channel (e.g., a Physical Uplink Control Channel (PUCCH)).

In various aspects of the disclosure, the UL traffic and control channel generation and transmission circuitry 1242 may be configured to generate and transmit a RACH signal utilizing a RACH configuration 1218 selected by the RACH configuration circuitry 1241. The UL traffic and control channel generation and transmission circuitry 1242 may further be configured to execute UL traffic and control channel generation and transmission software 1252 included on the computer-readable medium 1206 to implement one or more functions described herein.

The processor 1204 may further include downlink (DL) traffic and control channel reception and processing circuitry 1243, configured for receiving and processing downlink user data traffic on a traffic channel, and to receive and process control information on one or more downlink control channels. For example, the DL traffic and control channel reception and processing circuitry 1243 may be configured to receive a Physical Downlink Control Channel (PDCCH) and/or a Physical Downlink Shared Channel (PDSCH) within a slot. In some examples, received downlink user data traffic and/or control information may be temporarily stored in a data buffer 1216 within memory 1205.

In various aspects of the disclosure, the DL traffic and control channel reception and processing circuitry 1243 may further be configured to receive a signal (e.g., an SS block) from a scheduling entity that may be utilized by the RACH configuration circuitry 1241 to estimate the timing advance value and select the RACH configuration for a RACH signal. In some examples, the signal may be transmitted using a different carrier frequency or radio access technology (RAT) from the transmission of the RACH signal. The DL traffic and control channel reception and processing circuitry 1243 may further be configured to execute DL traffic and control channel reception and processing software 1253 included on the computer-readable medium 1206 to implement one or more functions described herein.

Figure 13:
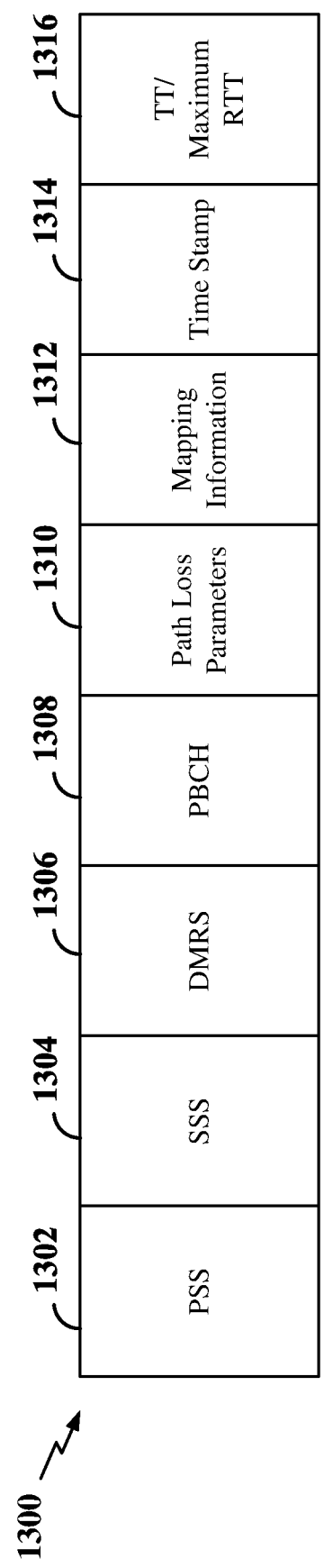
FIG. 13 is a diagram illustrating an exemplary synchronization signal (SS) block that may be transmitted within a wireless communication network

FIG. 13 is a diagram depicting an exemplary synchronization signal (SS) block 1300 that may be transmitted by a scheduling entity and received by a scheduled entity within a wireless communication network. In the example shown in FIG. 13, the SS block 1300 includes a Primary Synchronization Signal (PSS) 1302, Secondary Synchronization Signal (SS) 1304, a Demodulation Reference Signal (DMRS) 1306, and a Physical Broadcast Control Channel (PBCH) 1308. The PSS 1302 and SSS 1304 are each physical layer signals that convey information used for radio frame synchronization. The DMRS 1306 is a physical layer signal that functions as a reference signal for decoding the PBCH 1308. The PBCH 1308 is a physical layer signal that conveys minimum system information.

The SS block 1300 may further include (e.g., as part of the PBCH 1308 or separate from the PBCH 1308) one or more of the following additional information: path loss parameters 1310, mapping information 1312, a time stamp 1314 of the SS block 1300, and transmission time (TT)/maximum round trip time (RTT). The path loss parameters 1310 may be used by a scheduled entity for path loss measurement, whereas the mapping information 1312 may be used by a scheduled entity to map the measured path loss to an estimated timing advance value. For example, the mapping information 1312 may include a look-up table mapping ranges of measured path loss values to estimated timing advance values. As another example, the mapping information 1312 may include one or more mapping parameters that may be utilized in a mapping formula for mapping the measured path loss to the estimated timing advance value. Examples of mapping parameters may include, but are not limited to, a path loss exponent, a constant, or a back-off value). The time stamp 1314 may be used by a scheduled entity to estimate the timing advance value when the scheduling entity and scheduled entity share the same reference time (e.g., via GPS). For example the scheduled entity may estimate the RTT (and thus, the timing advance value) by comparing the time stamp 1314 within the received SS block 1300 to the current system time. In some examples, the predetermined RACH transmission time (TT) of a RACH signal and/or the maximum RTT 1316 in the cell (e.g., from which the predetermined RACH transmission time, CP length, and GT length may be discerned) may further be included in the SS block 1300.

Figure 14:
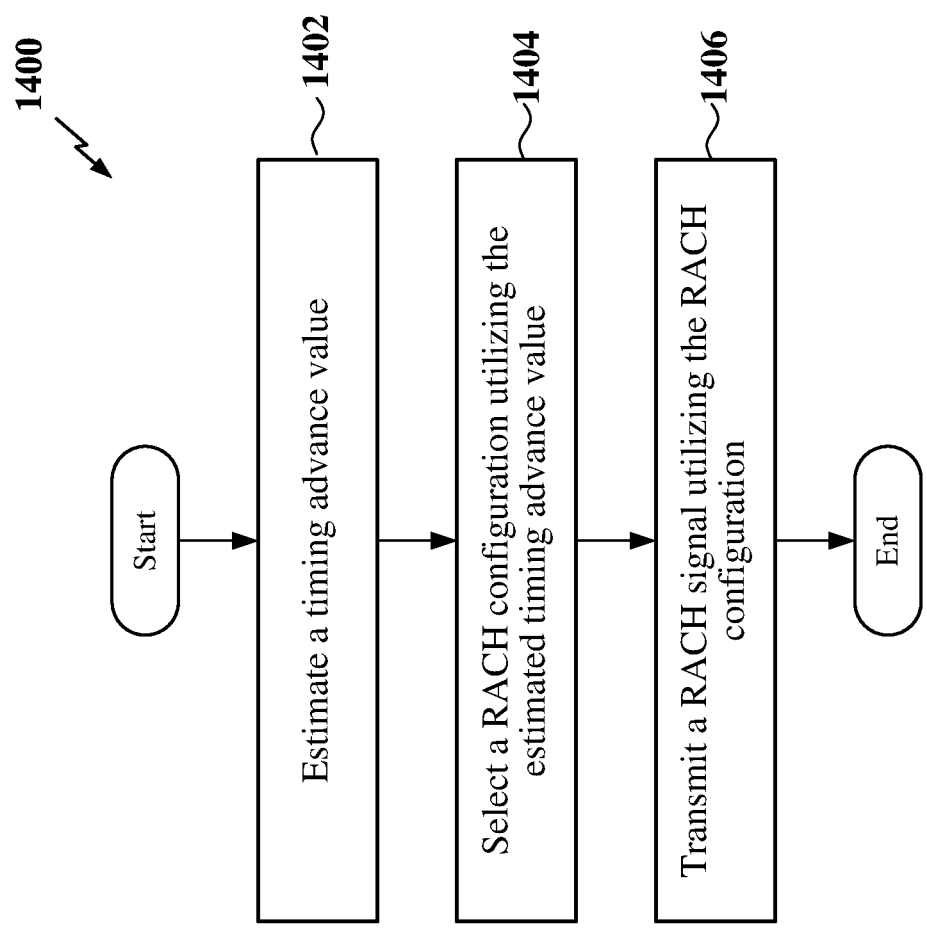
FIG. 14 is a flow chart illustrating an exemplary process operable at a scheduled entity for RACH configuration.

FIG. 14 is a flow chart illustrating a process 1400 operable at a scheduled entity for RACH configuration according to some aspects of the disclosure. As described below, some or all illustrated features may be omitted in a particular implementation within the scope of the present disclosure, and some illustrated features may not be required for implementation of all embodiments. In some examples, the process 1400 may be carried out by the scheduled entity illustrated in FIG. 12. In some examples, the process 1400 may be carried out by any suitable apparatus or means for carrying out the functions or algorithm described below.

At block 1402, the scheduled entity may estimate a timing advance value for communicating with a scheduling entity. In some examples, the timing advance value may be pre-stored or may be estimated based on pre-stored information (e.g., location and/or link distance). In some examples, the timing advance value may be estimated using a received signal (e.g., an SS block or other signal containing minimum system information). For example, the SS block may include the timing advance value, location and/or link distance. In another example, the timing advance value may be estimated by measuring the path loss of the SS block. In another example, the timing advance value may be estimated using a time stamp within the SS block. In some examples, the timing advance value may be estimated based on information received from a wireless node (e.g., another IAB node, another gNB or the same gNB using a different carrier frequency or RAT). For example, the RACH configuration circuitry 1241 shown and described above in connection with FIG. 12 may estimate the timing advance value.

At block 1404, the scheduled entity may select a RACH configuration utilizing the estimated timing advance value. In some examples, the RACH configuration includes a modified transmission timing utilizing the timing advance value and/or a reduced CP length and GT length. For example, the RACH configuration circuitry 1241 may select the RACH configuration.

At block 1406, the scheduled entity may generate and transmit a RACH signal utilizing the RACH configuration. For example, the UL traffic and control channel generation and transmission circuitry 1242 together with the transceiver 1210 shown and described above in connection with FIG. 12 may generate and transmit the RACH signal.

Figure 15:
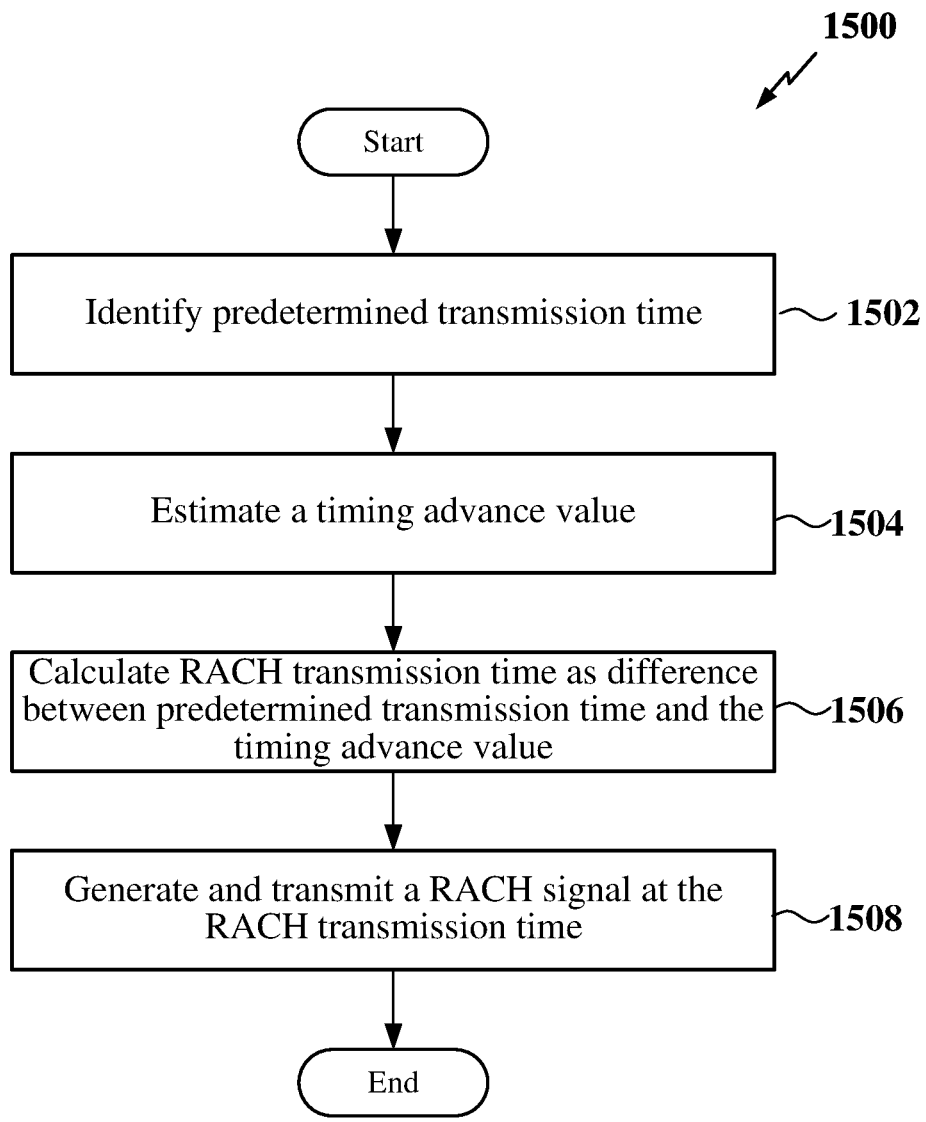
FIG. 15 is a flow chart illustrating another exemplary process operable at a scheduled entity for RACH configuration.

FIG. 15 is a flow chart illustrating a process 1500 operable at a scheduled entity for RACH configuration according to some aspects of the disclosure. As described below, some or all illustrated features may be omitted in a particular implementation within the scope of the present disclosure, and some illustrated features may not be required for implementation of all embodiments. In some examples, the process 1500 may be carried out by the scheduled entity illustrated in FIG. 12. In some examples, the process 1500 may be carried out by any suitable apparatus or means for carrying out the functions or algorithm described below.

At block 1502, the scheduled entity may identify a predetermined transmission time for a RACH signal. In some examples, the predetermined transmission time represents a delay from receipt of an SS block transmitted by a scheduling entity. For example, the predetermined transmission time may indicate a duration of time after receiving the SS block that the scheduled entity waits before transmitting the RACH signal. In some examples, the predetermined transmission time may be set based upon a maximum round-trip time (RTT) within the cell. In some examples, the RACH transmission time may be indicated in the SS block transmitted by the scheduling entity. For example, the DL traffic and control channel reception and processing circuitry 1243 and/or the RACH configuration circuitry 1241 shown and described above in connection with FIG. 12 may identify the predetermined transmission time.

At block 1504, the scheduled entity may estimate a timing advance value for communicating with a scheduling entity. In some examples, the timing advance value may be pre-stored or may be estimated based on pre-stored information (e.g., location and/or link distance). In some examples, the timing advance value may be estimated using a received signal (e.g., an SS block). For example, the SS block may include the timing advance value, location and/or link distance. In another example, the timing advance value may be estimated by measuring the path loss of the SS block. In another example, the timing advance value may be estimated using a time stamp within the SS block. In some examples, the timing advance value may be estimated based on information received from a wireless node (e.g., another IAB node, another gNB or the same gNB using a different carrier frequency or RAT). For example, the RACH configuration circuitry 1241 shown and described above in connection with FIG. 12 may estimate the timing advance value.

At block 1506, the scheduled entity may calculate a RACH transmission time as a difference between the predetermined transmission time and the timing advance value. For example, the RACH configuration circuitry 1241 shown and described above in connection with FIG. 12 may calculate the RACH transmission time.

At block 1508, the scheduled entity may generate and transmit a RACH signal at the RACH transmission time. For example, the UL traffic and control channel generation and transmission circuitry 1242 together with the transceiver 1210 shown and described above in connection with FIG. 12 may generate and transmit the RACH signal.

Figure 16:
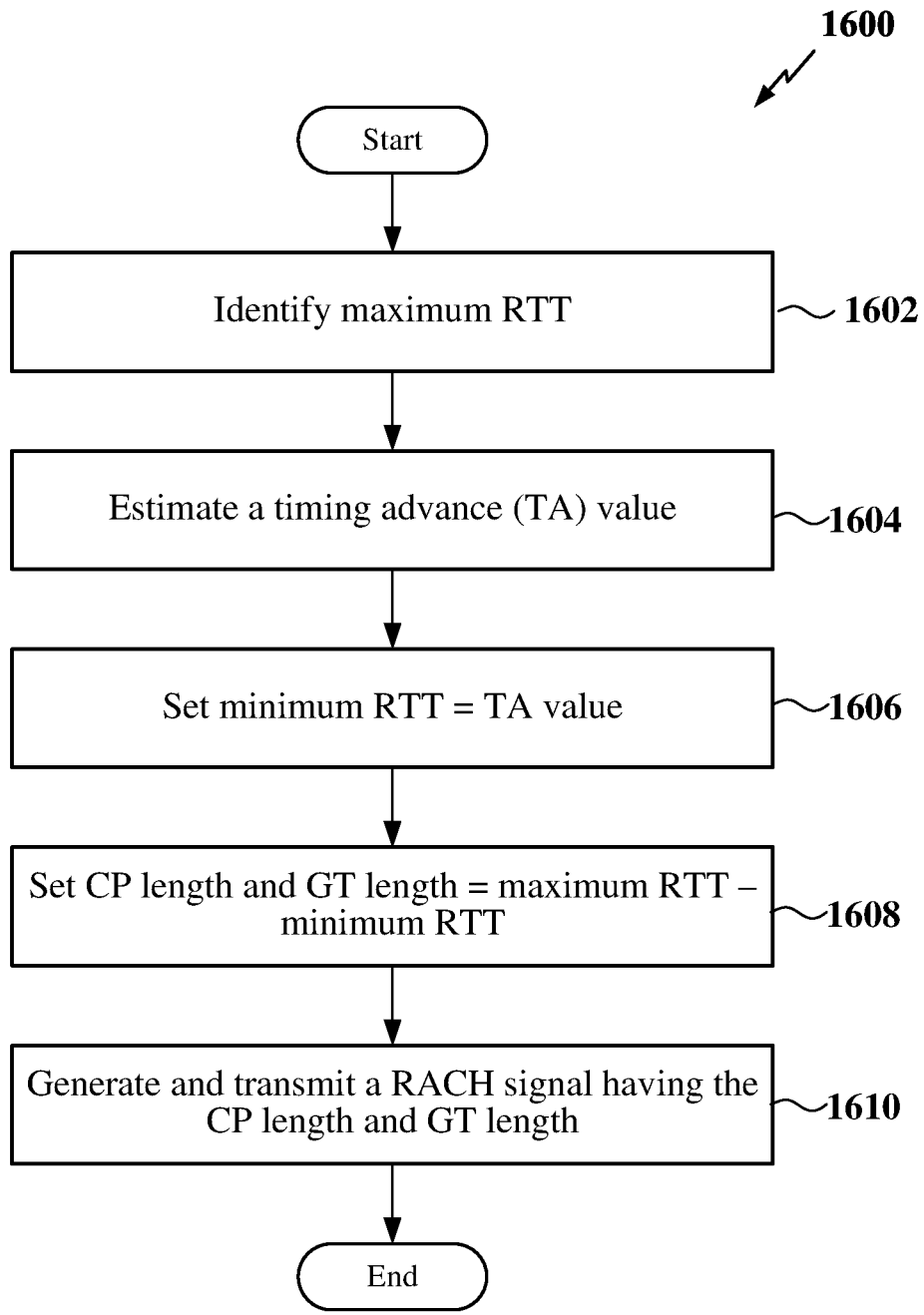
FIG. 16 is a flow chart illustrating another exemplary process operable at a scheduled entity for RACH configuration.

FIG. 16 is a flow chart illustrating a process 1600 operable at a scheduled entity for RACH configuration according to some aspects of the disclosure. As described below, some or all illustrated features may be omitted in a particular implementation within the scope of the present disclosure, and some illustrated features may not be required for implementation of all embodiments. In some examples, the process 1600 may be carried out by the scheduled entity illustrated in FIG. 12. In some examples, the process 1600 may be carried out by any suitable apparatus or means for carrying out the functions or algorithm described below.

At block 1602, the scheduled entity may identify a maximum round-trip time (RTT) within a cell associated with the scheduled entity. In some examples, the maximum RTT may be indicated in an SS block transmitted by a scheduling entity serving the cell that the scheduled entity is located in. In other examples, the maximum RTT may be predetermined and stored in the scheduled entity. For example, the DL traffic and control channel reception and processing circuitry 1243 and/or the RACH configuration circuitry 1241 shown and described above in connection with FIG. 12 may identify the maximum RTT.

At block 1604, the scheduled entity may estimate a timing advance (TA) value for communicating with a scheduling entity. In some examples, the timing advance value may be pre-stored or may be estimated based on pre-stored information (e.g., location and/or link distance). In some examples, the timing advance value may be estimated using a received signal (e.g., an SS block). For example, the SS block may include the timing advance value, location and/or link distance. In another example, the timing advance value may be estimated by measuring the path loss of the SS block. In another example, the timing advance value may be estimated using a time stamp within the SS block. In some examples, the timing advance value may be estimated based on information received from a wireless node (e.g., another IAB node, another gNB or the same gNB using a different carrier frequency or RAT). For example, the RACH configuration circuitry 1241 shown and described above in connection with FIG. 12 may estimate the timing advance value.

At block 1606, the scheduled entity may set a minimum RTT to be equal to the estimated TA value. For example, the RACH configuration circuitry 1241 shown and described above in connection with FIG. 12 may set the minimum RTT.

At block 1608, the scheduled entity may set the CP length and GT length of a RACH signal to each be equal to a difference between the maximum RTT and the minimum RTT. For example, the RACH configuration circuitry 1241 shown and described above in connection with FIG. 12 may set the CP length and GT length.

At block 1610, the scheduled entity may generate and transmit a RACH signal having the CP length and GT length set in accordance with the difference between the maximum RTT and the minimum RTT. For example, the UL traffic and control channel generation and transmission circuitry 1242 together with the transceiver 1210 shown and described above in connection with FIG. 12 may generate and transmit the RACH signal.

Figure 17:
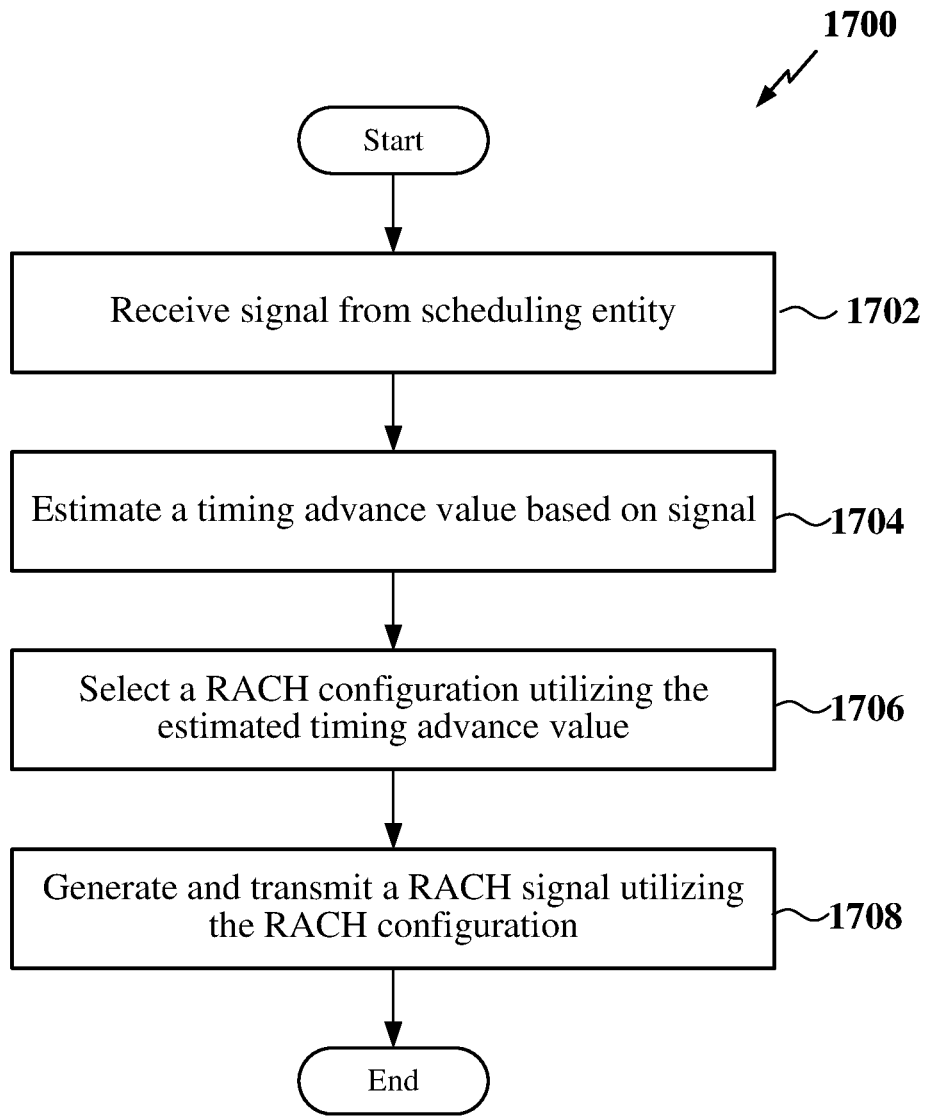
FIG. 17 is a flow chart illustrating another exemplary process operable at a scheduled entity for RACH configuration.

FIG. 17 is a flow chart illustrating a process 1700 operable at a scheduled entity for RACH configuration according to some aspects of the disclosure. As described below, some or all illustrated features may be omitted in a particular implementation within the scope of the present disclosure, and some illustrated features may not be required for implementation of all embodiments. In some examples, the process 1700 may be carried out by the scheduled entity illustrated in FIG. 12. In some examples, the process 1700 may be carried out by any suitable apparatus or means for carrying out the functions or algorithm described below.

At block 1702, the scheduled entity may receive a signal from a scheduling entity. In some examples, the signal may be an SS block transmitted from the scheduling entity to scheduled entities within the cell served by the scheduling entity. For example, the DL traffic and control channel reception and processing circuitry 1243 shown and described above in connection with FIG. 12 may receive the signal.

At block 1704, the scheduled entity may estimate a timing advance value for communicating with the scheduling entity based on the signal. In some examples, the SS block may include the timing advance value. In another example, the timing advance value may be estimated based on location and/or link distance information contained within the SS block. For example, the SS block may indicate the location of the scheduling entity and/or the link distance between the scheduling entity and the scheduled entity (or minimum possible distance between the scheduling entity and the scheduled entity). In another example, the timing advance value may be estimated by measuring the path loss of the SS block. In another example, the timing advance value may be estimated using a time stamp within the SS block. For example, the RACH configuration circuitry 1241 shown and described above in connection with FIG. 12 may estimate the timing advance value.

At block 1706, the scheduled entity may select a RACH configuration utilizing the estimated timing advance value. In some examples, the RACH configuration includes a modified transmission timing utilizing the timing advance value and/or a reduced CP length and GT length. For example, the RACH configuration circuitry 1241 may select the RACH configuration.

At block 1708, the scheduled entity may generate and transmit a RACH signal utilizing the RACH configuration. For example, the UL traffic and control channel generation and transmission circuitry 1242 together with the transceiver 1210 shown and described above in connection with FIG. 12 may generate and transmit the RACH signal.

Figure 18:
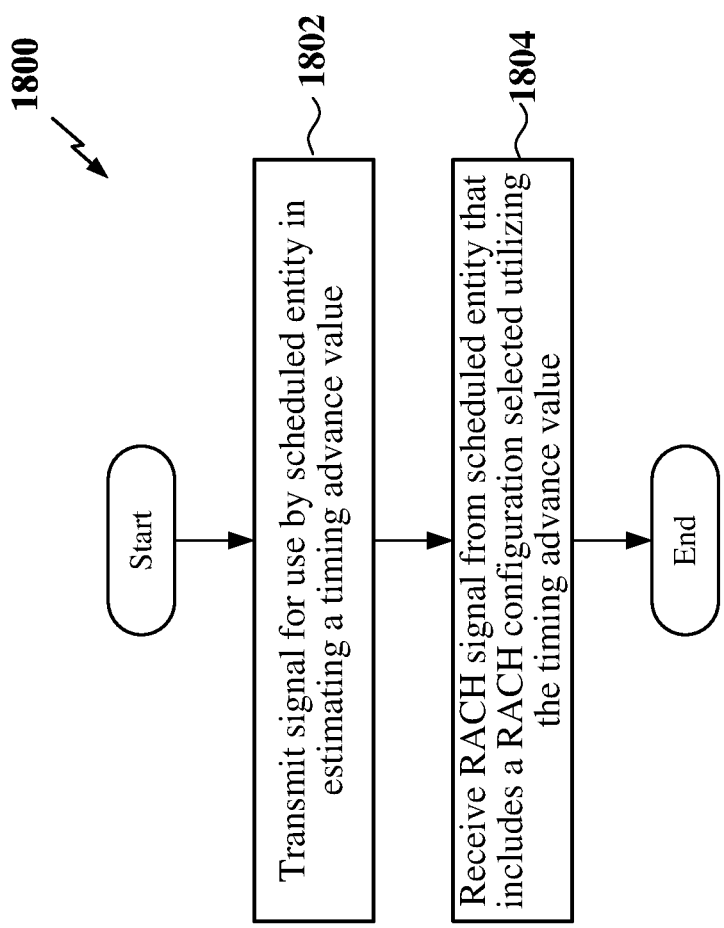
FIG. 18 is a flow chart illustrating an exemplary process operable at a scheduling entity for RACH configuration.

FIG. 18 is a flow chart illustrating a process 1800 operable at a scheduling entity for RACH configuration according to some aspects of the disclosure. As described below, some or all illustrated features may be omitted in a particular implementation within the scope of the present disclosure, and some illustrated features may not be required for implementation of all embodiments. In some examples, the process 1800 may be carried out by the scheduling entity illustrated in FIG. 11. In some examples, the process 1800 may be carried out by any suitable apparatus or means for carrying out the functions or algorithm described below.

At block 1802, the scheduling entity may transmit a signal for use by a scheduled entity in estimating a timing advance value. In some examples, the signal may include an SS block that carries a time stamp, the timing advance value, location, and/or link distance. In some examples, the signal may include one or more path loss parameters and/or path loss mapping information for use by the scheduled entity in measuring the path loss and estimating the timing advance from the measured path loss. In some examples, the signal may be transmitted using a different carrier frequency or radio access technology (RAT) from the transmission of the RACH signal. For example, the DL traffic and control channel generation and transmission circuitry 1143 shown and described above in connection with FIG. 11 may generate and transmit the signal.

At block 1804, the scheduling entity may receive a RACH signal from the scheduled entity that includes a RACH configuration selected utilizing the estimated timing advance value. In some examples, the RACH configuration may include a modified transmission timing utilizing the estimated timing advance value. In some examples, the RACH configuration may include a reduced CP length and GT length. For example, the UL traffic and control channel reception and processing circuitry 1144 and RACH configuration circuitry 1141 shown and described above in connection with FIG. 11 may receive and process the RACH signal.

Figure 19:
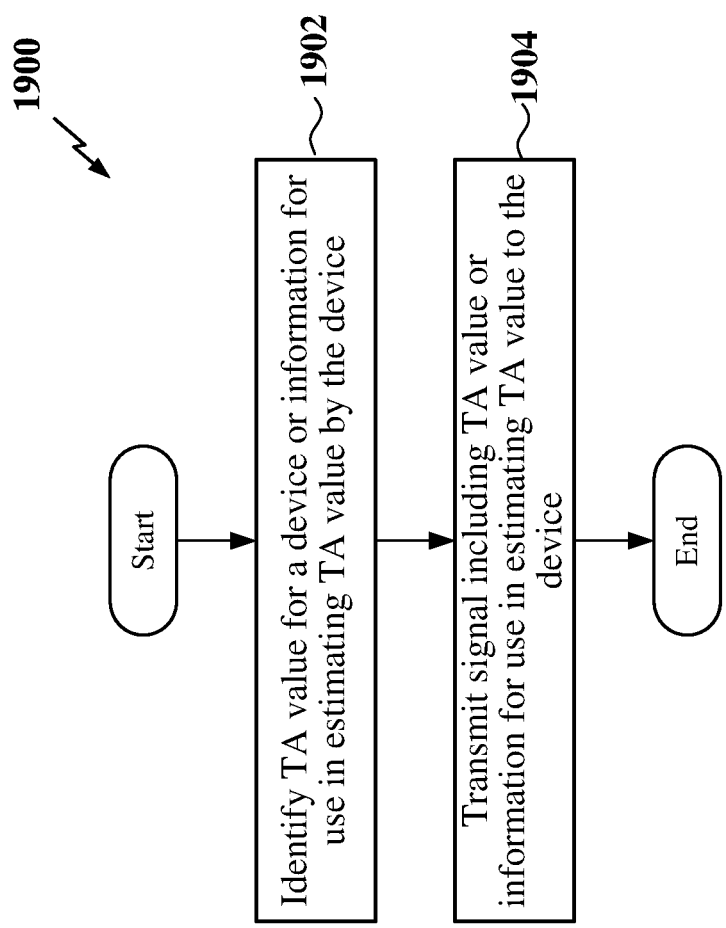
FIG. 19 is a flow chart illustrating an exemplary process operable at a wireless node for RACH configuration.

FIG. 19 is a flow chart illustrating a process 1900 operable at a wireless node for RACH configuration according to some aspects of the disclosure. As described below, some or all illustrated features may be omitted in a particular implementation within the scope of the present disclosure, and some illustrated features may not be required for implementation of all embodiments. In some examples, the process 1900 may be carried out by the scheduling entity illustrated in FIG. 11 or an IAB node illustrated in FIG. 8. In some examples, the process 1900 may be carried out by any suitable apparatus or means for carrying out the functions or algorithm described below.

At block 1902, the wireless node may identify a timing advance (TA) value for a device (e.g., another IAB node or UE) or information for use by the device in estimating the TA value. For example, the wireless node may maintain historical data containing TA values between IAB nodes in the wireless network, locations of gNB/IAB nodes in the wireless network, link distances between IAB nodes in the wireless network, and/or the minimum distance between two IAB nodes in the wireless network. For example, the RACH configuration circuitry 1141 shown and described above in connection with FIG. 11 may determine the TA value or information for use in estimating the TA value.

At block 1904, the wireless node may transmit a signal including the TA value or the information for use in estimating the TA value to the device. For example, the DL traffic and control channel generation and transmission circuitry 1143 may transmit the signal.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 4, 5, 7-9, 11 and 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a scheduled entity to communicate with a scheduling entity within a wireless communication network, comprising:

estimating a timing advance value for communicating with the scheduling entity;

selecting a random access channel (RACH) configuration utilizing the timing advance value, wherein the RACH configuration comprises at least a waveform configuration of a RACH signal;

setting each of a cyclic prefix (CP) length and a guard time (GT) length of the waveform configuration equal to a difference between an estimated maximum round-trip time (RTT) for communications between the scheduled entity and the scheduling entity and an estimated minimum RTT for communications between the scheduled entity and the scheduling entity; and transmitting the RACH signal utilizing the RACH configuration.

2. The method of claim 1, wherein selecting the RACH configuration further comprises:

calculating a transmission time of the RACH signal as a difference between a predetermined RACH transmission time and the timing advance value.

3. The method of claim 1, wherein the estimated minimum RTT is equal to the timing advance value.

4. The method of claim 1, wherein the scheduling entity comprises a first integrated-access-backhaul (IAB) node and the scheduled entity comprises a second IAB node.

5. The method of claim 4, wherein estimating the timing advance value further comprises:

estimating the timing advance value as the minimum round-trip time (RTT) for communications between the first IAB node and the second IAB node, wherein the minimum RTT is estimated based on a minimum distance between the first IAB node and the second IAB node.

6. The method of claim 1, wherein estimating the timing advance value further comprises:

receiving a signal from the scheduling entity; and estimating the timing advance value based on the signal.

7. The method of claim 6, wherein the signal comprises a synchronization signal (SS) block, a physical broadcast channel (PBCH), or an additional signal that comprises minimum system information.

8. The method of claim 7, wherein the signal comprises at least one of the timing advance value, a link distance between the scheduling entity and the scheduled entity, or a location of the scheduling entity.

9. The method of claim 6, wherein estimating the timing advance value based on the signal further comprises:

measuring a path loss of the signal; and estimating the timing advance value from the path loss.

10. The method of claim 9, wherein the signal comprises at least one of a path loss parameter for use in measuring the path loss or mapping information for mapping the path loss to the timing advance value.

11. The method of claim 6, wherein the signal comprises a time stamp, and wherein estimating the timing advance value based on the signal further comprises:

estimating the timing advance value utilizing the time stamp.

12. The method of claim 1, wherein estimating the timing advance value further comprises:

retrieving the timing advance value from a memory.

13. The method of claim 12, wherein the timing advance value comprises a previously estimated timing advance value previously estimated by the scheduled entity.

14. The method of claim 1, wherein estimating the timing advance value further comprises:

receiving the timing advance value or information for use in estimating the timing advance value from an additional wireless node.

15. A scheduled entity within a wireless communication network, comprising:

a transceiver configured to communicate with a scheduling entity in the wireless communication network;

a memory; and a processor communicatively coupled to the transceiver and the memory, the processor configured to:

estimate a timing advance value for communicating with the scheduling entity;

select a random access channel (RACH) configuration utilizing the timing advance value, wherein the RACH configuration comprises at least a waveform configuration of a RACH signal;

set each of a cyclic prefix (CP) length and a guard time (GT) length of the waveform configuration equal to a difference between an estimated maximum round-trip time (RTT) for communications between the scheduled entity and the scheduling entity and an estimated minimum RTT for communications between the scheduled entity and the scheduling entity; and transmit the RACH signal utilizing the RACH configuration via the transceiver.

16. The scheduled entity of claim 15, wherein the processor is further configured to:

calculate a transmission time of the RACH signal as a difference between a predetermined RACH transmission time and the timing advance value.

17. The scheduled entity of claim 15, wherein the estimated minimum RTT is equal to the timing advance value.

18. The scheduled entity of claim 15, wherein the scheduling entity comprises a first integrated-access-backhaul (IAB) node and the scheduled entity comprises a second IAB node, and wherein the processor is further configured to:

estimate the timing advance value as the minimum round-trip time (RTT) for communications between the first IAB node and the second IAB node, wherein the minimum RTT is estimated based on a minimum distance between the first IAB node and the second IAB node.

19. The scheduled entity of claim 15, wherein the processor is further configured to:

receive a signal from the scheduling entity; and estimate the timing advance value based on the signal.

20. A method of wireless communication operable at a scheduling entity within a wireless communication network, comprising:

transmitting a signal to a scheduled entity for use by the scheduled entity in estimating a timing advance value; and receiving a random access channel (RACH) signal from the scheduled entity based on the timing advance value;

wherein the RACH signal comprises a RACH configuration selected utilizing the timing advance value, wherein the RACH configuration comprises at least a waveform configuration of the RACH signal, and wherein the waveform configuration comprises a cyclic prefix (CP) length and a guard time (GT) length, and wherein each of the CP length and the GT length is equal to a difference between a maximum round-trip time (RTT) for communications between the scheduled entity and the scheduling entity and a minimum RTT for communications between the scheduled entity and the scheduling entity.

21. The method of claim 20, further comprising:
receiving an additional RACH signal from an additional scheduled entity based on an additional timing advance value, wherein the additional RACH signal comprises an additional RACH configuration selected utilizing the additional timing advance value, wherein the additional RACH configuration is different than the RACH configuration.

22. The method of claim 20, wherein the RACH configuration further comprises a transmission time of the RACH signal, the transmission time of the RACH signal being equal to a difference between a predetermined RACH transmission time and the timing advance value.

23. The method of claim 20, wherein the signal comprises a different carrier frequency or radio access technology than the RACH signal.

24. The method of claim 20, wherein the signal comprises at least one of the timing advance value, a link distance between the scheduling entity and the scheduled entity, or a location of the scheduling entity.

25. A scheduling entity within a wireless communication network, comprising:
a transceiver configured to communicate with a scheduled entity in the wireless communication network;
a memory; and
a processor communicatively coupled to the transceiver and the memory, the processor configured to:
transmit a signal to the scheduled entity via the transceiver for use by the scheduled entity in estimating a timing advance value; and
receive a random access channel (RACH) signal via the transceiver from the scheduled entity based on the timing advance value;
wherein the RACH signal comprises a RACH configuration selected utilizing the timing advance value,
wherein the RACH configuration comprises at least a waveform configuration of the RACH signal,
wherein the waveform configuration comprises a cyclic prefix (CP) length and a guard time (GT) length, and wherein each of the CP length and the GT length is equal to a difference between a maximum round-trip time (RTT) for communications between the scheduled entity and the scheduling entity and a minimum RTT for communications between the scheduled entity and the scheduling entity.

26. The scheduling entity of claim 25, wherein the signal comprises a different carrier frequency or radio access technology than the RACH signal.

27. The scheduling entity of claim 25, wherein the signal comprises at least one of the timing advance value, a link distance between the scheduling entity and the scheduled entity, or a location of the scheduling entity.

* * * * *